US 10,657,152 B2

(12) United States Patent
Bhoovaraghavan et al.

(10) Patent No.: US 10,657,152 B2
(45) Date of Patent: May 19, 2020

(54) SYNCHRONIZATION OF DIAGRAMS AND ASSOCIATED STRUCTURED DATA

(71) Applicant: Microsoft Technology Licensing, LLC, Redmond, WA (US)

(72) Inventors: Mukundan Bhoovaraghavan, Hyderabad (IN); Sandeep Kumar Srivastava, Hyderabad (IN); Amit Joshi, Kusumkhera (IN); Salony Jain, Hyderabad (IN); Manjeet Bothra, Hyderabad (IN); Shashank Gandhi, Hyderabad (IN); Ashutosh Tripathi, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 226 days.

(21) Appl. No.: 15/609,527

(22) Filed: May 31, 2017

(65) Prior Publication Data

US 2018/0349461 A1 Dec. 6, 2018

(51) Int. Cl.
*G06F 16/00* (2019.01)
*G06F 16/27* (2019.01)
(Continued)

(52) U.S. Cl.
CPC ........ *G06F 16/275* (2019.01); *G06F 16/2282* (2019.01); *G06F 16/248* (2019.01);
(Continued)

(58) Field of Classification Search
CPC .... G06F 16/275; G06F 16/26; G06F 16/2282; G06F 16/248; G06F 16/258
See application file for complete search history.

(56) References Cited

U.S. PATENT DOCUMENTS 6,718,336 B1 4/2004 Saffer et al.
7,162,502 B2 1/2007 Suarez et al.
(Continued)

FOREIGN PATENT DOCUMENTS

WO 2010080212 A2 7/2010

OTHER PUBLICATIONS

Wied, Patrick, "Data Visualization + AngularJS =? Why?", https://www.patrick-wied.at/blog/data-visualization-with-angularjs-why, Published on: Jun. 24, 2014, 7 pages.
(Continued)

*Primary Examiner* — Tarek Chbouki
(74) *Attorney, Agent, or Firm* — Michael Best & Friedrich LLP

(57) ABSTRACT

Methods and systems for generating a diagram from structured data and synchronizing modifications between the diagram and the structured data. One system includes at least one processor configured to receive a plurality of transformation settings for the structured data and generate and store a plurality of first expressions and a plurality of second expressions based on the structured data and the plurality of transformation settings. The processor is further configured to generate and organize a plurality of visual structures based on the plurality of first expressions and the plurality of second expressions and generate and output a diagram for display through a user interface including the plurality of visual structures. In addition, the processor is configured to receive a modification to the diagram through the user interface, and modify the structured data based on the modification, the plurality of first expressions, and the plurality of second expressions.

20 Claims, 19 Drawing Sheets

(51) Int. Cl.
*G06F 16/26* (2019.01)
*G06F 16/22* (2019.01)
*G06F 16/248* (2019.01)
*G06F 16/25* (2019.01)
*G06F 40/18* (2020.01)

(52) U.S. Cl.
CPC ............ *G06F 16/258* (2019.01); *G06F 16/26* (2019.01); *G06F 40/18* (2020.01)

(56) References Cited

U.S. PATENT DOCUMENTS

| | | | |
|---|---|---|---|
| 8,166,449 B2 | 4/2012 | Jazdzewski | |
| 8,788,574 B2 | 7/2014 | Beckman et al. | |
| 2003/0083846 A1* | 5/2003 | Curtin | G06Q 30/02 702/182 |
| 2007/0279416 A1 | 12/2007 | Cobb et al. | |
| 2009/0006318 A1 | 1/2009 | Lehtipalo et al. | |
| 2011/0208786 A1* | 8/2011 | Ghosh | G06Q 10/06 707/805 |
| 2012/0144325 A1* | 6/2012 | Mital | G06F 3/04847 715/763 |
| 2014/0123061 A1* | 5/2014 | Bennett | G16H 15/00 715/808 |
| 2015/0363478 A1* | 12/2015 | Haynes | G06F 16/26 707/625 |
| 2016/0179930 A1* | 6/2016 | Radivojevic | G06F 3/0482 707/792 |
| 2017/0076471 A1* | 3/2017 | Prophete | G06T 11/206 |
| 2017/0132397 A1* | 5/2017 | Leitner | G16H 10/40 |

OTHER PUBLICATIONS

Zhang, Hugh, "Oracle : Introduction to JET Data Visualization and Charting", https://community.oracle.com/community/development_tools/oracle-jet/blog/2015/11/05/introduction-to-jet-data-visualization-and-charting, Published on: Nov. 5, 2015, 8 pages.

Felix, et al., "TextTile: An Interactive Visualization Tool for Seamless Exploratory Analysis of Structured Data and Unstructured Text", In Proceedings of IEEE Transactions on Visualization and Computer Graphics, vol. 23, Issue 1, Jan. 2017, 10 pages.

"StatSilk : StatPlanet Cloud", https://www.statsilk.com/software/statplanet-cloud, Published on: Nov. 13, 2016, 6 pages.

* cited by examiner

| Process Step ID | Process Step Description | Next Step ID | Connector Label | Shape Type | Function | Phase |
|---|---|---|---|---|---|---|
| 1 | Start | 2 | | Start | Sales Team | Month 1 |
| 2 | Receive solution request | 3 | | Process | Sales Team | Month 1 |
| 3 | Project technically feasible? | 4,2 | Yes,No | Decision | Sales Team | Month 2 |
| 4 | Cost estimation | 5 | | Process | Sales Team | Month 2 |
| 5 | Get user requirement | 6 | | Data | Product Team | Month 2 |
| 6 | Create solution architecture | 7 | | Process | Product Team | Month 3 |
| 7 | Designs and mockups | 8 | | Data | Product Team | Month 3 |
| 8 | Create proposal deck | 9 | | Data | Product Team | Month 3 |
| 9 | Pitch to the client | 10 | | Process | Sales Team | Month 4 |
| 10 | Get buy off from stakeholders | 11 | | Process | Sales Team | Month 4 |
| 11 | Publish the Agile plan | 12 | | Process | Development Team | Month 4 |
| 12 | Solution development | 13 | | Process | Development Team | Month 5 |
| 13 | Functional testing | 14,12 | Pass,Fail | Decision | Development Team | Month 6 |
| 14 | Usability testing | 15 | | Subprocess | Development Team | Month 6 |
| 15 | Review with stakeholders | 16 | | Process | Product Team | Month 6 |
| 16 | Support documentation | 17 | | Data | Product Team | Month 6 |
| 17 | Internal Sign-off | 18 | | Subprocess | Product Team | Month 6 |
| 18 | Solution Implementation | 19 | | Process | Development Team | Month 7 |
| 19 | Conduct trainings | 20 | | Subprocess | Sales Team | Month 8 |
| 20 | Handle early support incidents | 21 | | Process | Development Team | Month 8 |
| 21 | Request completions and hand-off | 22 | | Process | Development Team | Month 8 |
| 22 | Completion | | | End | Product Team | Month 9 |

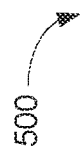

FIG. 5

| Diagram Bindings | VisualMapping | Association |
|---|---|---|
| DiagramBindings.Row_1 | =SHAPEBINDING(MasterSelectors.Row_3, "Process Step ID", "Process Step Description", "") | =MEMBEROFGRID(DiagramBindings.Row_3, "Function", "Phase") |
| MasterSelectors.Row_2 | =CONNECTORBINDING(MasterSelectors.Row_4, "Process Step ID", "Next Step ID", 1, "Connector Labels", "", "") | |
| MasterSelectors.Row_3 | =CFFBINDING(0, "Function", "Phase", FALSE, TRUE) | |

1100

Generated based on settings received through UI 600

Generated based on settings received through UI 700

Generated based on settings received through UI 900

FIG. 11

| Master Selectors | MasterColumn | MasterMapping |
|---|---|---|
| MasterSelectors.Row_3 | "Shape Type" | =MASTERMAP("ProcessMap.vssx\|Process", "Process", "ProcessMap.vssx\|Process", "Decision", "BasicShapesMap.vssx\|Decision", "Subprocess", "ProcessMap.vssx\|Subprocess", "Start", "ProcessMap.vssx\|Start/End", "End", "ProcessMap.vssx\|Start/End", "Document", "ProcessMap.vssx\|Document", "Data", "ProcessMap.vssx\|Data", "Database", "ProcessMap.vssx\|Database", "External Data", "ProcessMap.vssx\|External Data") |
| MasterSelectors.Row_4 | | =MASTERMAP("connec_u.vssx\|Dynamic Connector") |

Generated based on selections received through UI 800

FIG. 12

| Process Step ID | Process Step Description | Next Step ID | Connector Labels | Shape Type | Function | Phase |
|---|---|---|---|---|---|---|
| 1 | Start | 2 | | Start | Sales | |
| 2 | Receive solution request | 3 | | Process | Sales | |
| 3 | Project technically feasible? | 4,2 | Yes,No | Decision | Sales | |
| 4 | Cost estimation | 5 | | Process | Devel | |
| 5 | Get user requirement | 6 | | External Data | Produ | |
| 6 | Designs and mockups | 7 | | Process | Produ | |
| 7 | Pitch to the client | 8 | | Subprocess | Sales | |
| 8 | Get buy off from stakeholders | 9 | | Process | Devel | |
| 9 | Publish the Agile plan | 10 | | Data | Devel | |
| 10 | Solution Development | 11 | | Process | Produ | |
| 11 | Functional testing | 12,10 | Pass,Fail | Decision | Sales | |
| 12 | Review with stakeholders | 13 | | Process | Produ | |
| 13 | Support documentation | 14 | | Document | Deve | |
| 14 | Internal sign-off | 15 | | Process | Produ | |
| 15 | Solution implementation | 16 | | Process | Sales | |
| 16 | Request completions and hand-off | 16.1 | | Process | Product Team | |
| 16.1 | follow up | 17 | | Subprocess | Sales Team | Month 3 |

FIG. 14

External Data

| Process Step ID | Process | Next Step ID | Connector Labels | Shape Type | Function | Phase ▽ | Owner | Cost | Start Date | End Da |
|---|---|---|---|---|---|---|---|---|---|---|
| 1 | Start | 2 | | Start | Sales... | M ✗ (Select All) | | | | |
| 2 | Recei... | 3 | | Process | Sales... | M ✓ Month 1 | Audr... | $1,00... | | |
| 3 | Proje... | 4,2 | Yes,No | Decision | Sales... | M ✓ Month 2 | Brend... | $2,50... | | |
| 4 | Cost... | 5 | | Process | Devel... | M ✓ Month 3 | Fausti... | $1,50... | | |
| 5 | Get u... | 6 | | External D... | Prod... | Month 1 | Kelse... | $1,00... | | |
| 6 | Design... | 7 | | Process | Prod... | Month 1 | Char... | $1,00... | | |
| 7 | Pitch... | 8 | | Subprocess | Sales... | Month 2 | Leish... | $1,30... | | |
| 8 | Get b... | 9 | | Process | Devel... | Month 2 | Leish... | $500... | | |
| 9 | Publi... | 10 | | Data | Devel... | Month 2 | Verdi... | $200... | | |
| 10 | Soluti... | 11 | | Process | Prod... | Month 2 | Wane... | $3,50... | | |
| 11 | Funct... | 12,10 | Pass,Fail | Decision | Sales... | Month 2 | Wade... | $1,50... | | |
| 12 | Revie... | 13 | | Process | Prod... | Month 2 | Verdi... | $1,40... | | |
| 13 | Supp... | 14 | | Document | Devel... | Month 3 | Lorett... | $600... | | |
| 14 | Inter... | 15 | | Process | Prod... | Month 3 | Lorett... | $300... | | |
| 15 | Soluti... | 16 | | Process | Sales... | Month 3 | Jerrie... | $1,50... | | |
| 16 | Requ... | 16.1 | | Process | Prod... | Month 3 | Audr... | $400... | | |
| 16.1 | follo... | 17 | | Subprocess | Sales... | Month 3 | | | | |
| 17 | End | | | End | Sales... | Month 3 | Audr... | | | |

| Day | Process Step ID | Tickets |
|---|---|---|
| 1 | 2 | 10 |
| 1 | 3 | 12 |
| 2 | 2 | 15 |
| 2 | 3 | 25 |
| 3 | 2 | 12 |
| 3 | 3 | 32 |
| 4 | 2 | 6 |
| 4 | 3 | 15 |

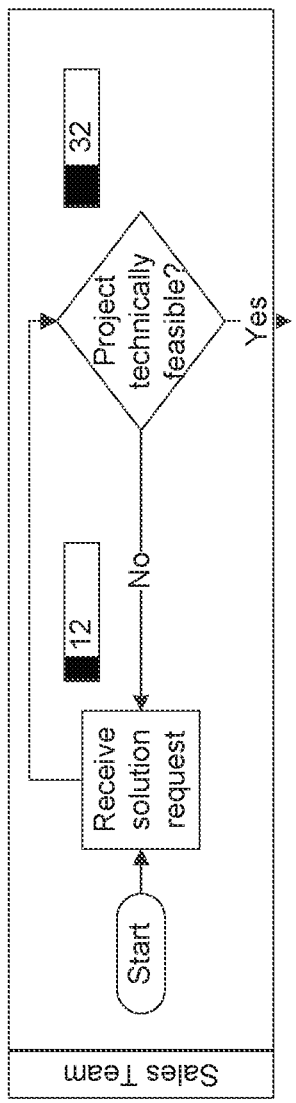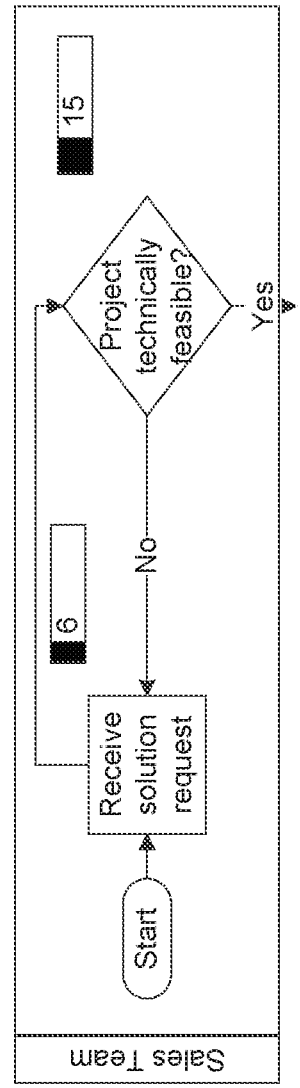
FIG. 18c
FIG. 18d

SYNCHRONIZATION OF DIAGRAMS AND ASSOCIATED STRUCTURED DATA

FIELD

Embodiments described herein relate to generating a diagram from structured data and synchronizing the diagram and the structured data when either is changed.

SUMMARY

Enterprises have a variety of structured data defining systems, organizations, processes, workflows, network dependencies, data flows, and the like. Diagrams may be created from this structured data to provide a visual representation of the structured data to aid analysis, adjustment, and explanation of the structured data. Traditionally, such diagrams are created manually, which is time-consuming and subject to human error. Furthermore, when a manually-created diagram is modified after creation, the diagram becomes unsynchronized with the associated structured data. Similarly, when the structured data changes, the diagram must be manually modified. Accordingly, maintaining synchronization between the diagram and the structured data, when both can be changed, can be difficult and error prone.

Thus, embodiments described herein generate diagrams from structured data and synchronize the diagram and the structured data when the diagram, the structured data, or both are modified. A diagram includes a set of visual structures, such as shapes, connectors, and containers (including a set of shapes and connectors). A visual structure may include properties, such as a description, a value, a size, a number of connectors, a shape type, and the like. A visual structure may also include interactivities, such as expanse and collapse functionality, context sensitive hints, annotations, and the like. Structured data includes primitive data types like numbers, text, or images; complex data types including objects that include sets of data, such as sets, lists, matrices, trees or hierarchies, or graph; or a combination thereof. Structured data may also include constraints, such as uniqueness (a process identification value may not be duplicated), type (a data value must be a numerical integer, a currency value, a string, or the like), dependency (one step is a pre-requisite to other data), and the like, and these constraints may need to be adhered to within the diagram. Similarly, visual structures within a diagram may have constraints that may need to be adhered both during diagram generation as well as subsequent modification.

Accordingly, to map the structured data to a diagram, embodiments described herein may generate one or more expressions that provide two-way mappings between structured data and a diagram. For example, one or more expressions may map a particular data record included in the structured data to a particular visual structure (for example, a shape) included in a diagram and may map values included in the data record (numerical values, text strings, and the like) to particular properties of the visual structure. Using these expressions allows for automatic generation of a diagram from structured data wherein modifications to the diagram, the structured data, or both may be synchronized between the diagram and the structured data.

For example, one embodiment provides a system for generating a diagram from structured data and synchronizing modifications between the diagram and the structured data. The system includes at least one processor configured to access a structured data representation, the structured data representation including a plurality of data records and receive a plurality of transformation settings for the structured data representation. The at least one processor is also configured to generate and store a plurality of first expressions based on the structured data representation and the plurality of transformation settings and generate and store a plurality of second expressions based on the structured data representation and the plurality of transformation settings. Each of the plurality of first expressions maps one of the plurality of data records to a visual structure, and each of the plurality of second expressions transforms data included in one of the plurality of data records into a property of a visual structure.

The at least one processor is further configured to generate and organize a plurality of visual structures based on the plurality of first expressions and the plurality of second expressions. The plurality of visual structures includes at least one shape and at least one connector. The at least one processor is also configured to generate and output a diagram for display through a user interface, wherein the diagram includes the plurality of visual structures. The at least one processor is further configured to receive a modification to the diagram through the user interface, and modify the structured data representation based on the modification, the plurality of first expressions, and the plurality of second expressions.

Another embodiment provides a method of generating a diagram from structured data and synchronizing modifications between the diagram and the structured data. The method includes accessing a structured data representation including a plurality of data records and receiving a plurality of transformation settings for the structured data representation. The method also includes generating and storing a plurality of first expressions based on the structured data representation and the plurality of transformation settings and generating and storing a plurality of second expressions based on the structured data representation and the plurality of transformation settings. Each of the plurality of first expressions mapping one of the plurality of data records to a visual structure, and each of the plurality of second expressions transforming data included in one of the plurality of data records into a property of a visual structure.

In addition, the method includes generating and organizing, with a processor, a plurality of visual structures based on the plurality of first expressions and the plurality of second expressions (including at least one shape and at least one connector) and generating and outputting, with the processor, the diagram for display through a user interface, wherein the diagram including the plurality of visual structures. The method further includes receiving, with the processor, a modification to the diagram through the user interface, validating, with the processor, the modification, and, in response to validating the modification, modifying, with the processor, the structured data representation based on the modification, the plurality of first expressions, and the plurality of second expressions.

Yet another embodiment provides a non-transitory, computer-readable medium storing instructions that, when executed by a processor, perform a set of functions. The set of functions includes receiving a plurality of transformation settings for a structured data representation and generating and storing a plurality of expressions based on the structured data representation and the plurality of transformation settings. The set of functions also includes generating and organizing a plurality of visual structures based on the plurality of expressions (the plurality of visual structures including at least one shape and at least one connector) and generating and outputting a diagram for display through a user interface. The displayed diagram includes the plurality of visual structures. The set of functions further includes receiving a first modification to the diagram through the user interface, modifying the structured data representation based on the first modification and the plurality of expressions, receiving a second modification to the structured data representation, and modifying the diagram based on the second modification and the plurality of expressions.

BRIEF DESCRIPTION OF THE DRAWINGS

FIG. 5 is a sample spreadsheet file including tabular structured data.

FIGS. 10-12 represent sample expressions generated based on received transformation settings for mapping the selected structured data to visual structures included in a diagram.

FIGS. 14 and 15 illustrate user interfaces for setting a filter for a diagram.

FIGS. 18a-d illustrate a diagram animation based on the structured data of FIG. 17.

DETAILED DESCRIPTION

Figure 1:
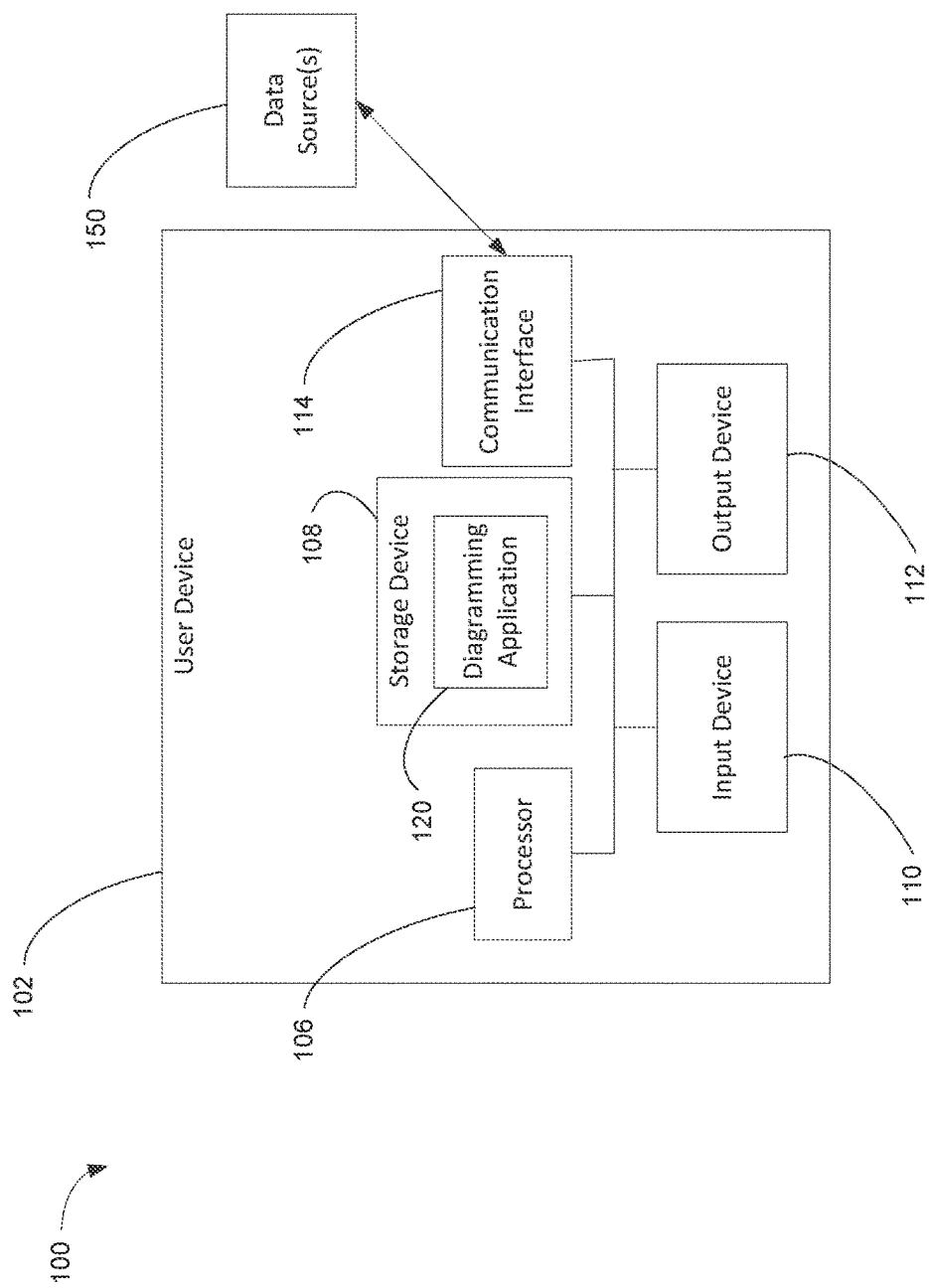
FIG. 1 schematically illustrates a system for generating and synchronizing diagrams and structured data.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored on non-transitory, computer-readable medium. Similarly, embodiments described herein may be implemented as non-transitory, computer-readable medium storing instructions executable by one or more electronic processors to perform the described functionality. As used in the present application, "non-transitory, computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As noted above, data sources, such as, but not limited to, information systems, data bases, spreadsheets, and other sources of structured data, often store structured data representing interacting components (data, organizations, departments, processes, and the like), including relationships between such components, states of such components, and the like. For example, structured data may define systems, organizations, processes, workflows, network dependencies, data flows, and the like. The structured data may be represented in tabular form, such as within a spreadsheet file, or in a non-tabular form, such as within a mark-up language or objection notation file that uses ordered lists, tags, or name/value pairs to organize data.

When a user wants to represent the structured data visually, the user manually creates a diagram using a diagramming application, such as Visio® provided by Microsoft Corporation, Adobe Illustrator® provided by Adobe Systems Incorporated, and the like. Within the diagramming application, the user creates visual structures (shapes, connectors, containers, and combinations thereof), formats each visual structure (by adding text, adding values, changing the size, the font, or the style), and organizes the visual structures to create a diagram. Typically, such a diagram represents the user's mental model of the structured data. It should be understood that a diagram differs from a chart in a variety of ways. For example, a chart visualizes one state of data (for example, tallies of particular data types, changes in pricing or other financial data, or the like), wherein a diagram captures relationships and interactions between data records that represent a collection of related components, such as departments within an enterprise, tables within a database, computer network connections, and the like through connected shapes and other visual structures.

Within such a diagramming application, a user may freely modify diagrams. Accordingly, when a user modifies a diagram, the underlying structured data used to manually create the diagram may no longer correspond with the diagram. Similarly, when the underlying structured data is modified, the generated diagram may no longer accurately represent the structured data, which may create confusion and inefficiencies. For example, when a user accesses a diagram representing the organization of an enterprise to identify where to send a particular request but the diagram is out-of-date, the user may deliver the request to the wrong individual and may spend considerable time determining the proper recipient of the request. Similarly, when the diagram and the structured data are not synchronized, it may be difficult to determine whether the diagram or the structured data is correct, which again wastes resources and causes other inefficiencies.

Accordingly, as also noted above, embodiments described herein generate diagrams from structured data and synchronize the diagram and the structured data when the diagram, the structured data, or both are modified. For example, when a user modifies a diagram generated within a diagramming application based on structured data, the structured data is automatically modified. As one example, when a user modifies a description of a shape included in a diagram, the associated structured data, such as a particular data record within the structured data, is automatically modified based on the modified description. Similarly, when a user changes a connector from one shape to a different shape, changes the order of shapes, or moves shapes from one container to another container, the associated structured data is automatically modified. Furthermore, when the structured data is modified (manually or automatically through one or more computer systems, such as part of an automatic logging operation), the corresponding diagram is similarly automatically modified. Also, in some embodiments, before synchronization is performed between the diagram and the structured data, modifications to the structured data or the diagram are validated based on one or more constraints. For example, when a process step represented in structured data has a prerequisite step and a user modifies a diagram to remove this prerequisite step, the user may be informed that the modification is not valid (and, thus, the modification may be rejected).

As described in more detail below, to enable such bi-directional synchronization, two-way expressions are defined between the diagram and the structured data. Accordingly, when either the structured data or the diagram is modified, the corresponding expressions are evaluated to determine how to maintain synchronization between the structured data and the diagram. In particular, based on the expressions, when text is modified within a diagram, the expressions are evaluated to identify the corresponding structured data (a data record included in a structured data) and to compute a modification to the identified structured data (what text to add to the structured data). In the same way, when a data value within a data record contained in the structured data is modified, the expressions are evaluated to identify the visual structure included in a diagram to modify and compute a modification for the identified visual structure. For example, when a shape contains numerical data represented as a string, the expressions may define how to transform the string to a numerical value for storage within the structured data and vice versa. These expressions are defined during a binding or association process that maps data records to visual structures.

FIG. 1 illustrates a system 100 for generating a data-driven diagram from structured data and synchronizing the diagram and the structured data according to one embodiment. As illustrated in FIG. 1, the system 100 includes a user device 102. The user device 102 may be a laptop or desktop computer, a tablet computer, a smart phone, a smart television, or another type of computing device. As illustrated in FIG. 1, the user device 102 includes a processor 106, a storage device 108, an input device 110, an output device 112, and a communication interface 114. The processor 106, the storage device 108, the input device 110, the output device 112, and the communication interface 114 communicate over one or more communication lines or buses, wireless connections, or a combination thereof. It should be understood that, in various configurations, the user device 102 may include additional or alternative components than those illustrated in FIG. 1 and may perform additional functions than the functionality described herein. For example, in some embodiments, the user device 102 may include multiple processors, storage devices, input devices, output devices, communication interfaces, or a combination thereof.

The processor 106 may include one or more microprocessors, application-specific integrated circuit (ASIC), or other suitable electronic devices. The storage device 108 includes non-transitory, computer readable medium. For example, the storage device 108 may include a hard disk, an optical storage device, a magnetic storage device, ROM (read only memory), RAM (random access memory), register memory, a processor cache, or a combination thereof. The input device 110 receives input from a user. For example, the input device 110 may be a keyboard, keypad, a mouse or trackball, a touchscreen, a microphone, a camera, or the like. Similarly, the output device 112 provides output to a user. For example, the output device 112 may be a light emitting diode (LED), a display, a speaker, or the like. The communication interface 114 sends data to devices or networks external to the user device 102, receives data from devices or networks external to the user device 102, or a combination thereof. For example, the communication interface 114 may include a transceiver for wirelessly communicating over one or more communication networks, such as a wide area network, such as the Internet, a local area network, such as Bluetooth™ network or Wi-Fi, and combinations or derivatives thereof. Alternatively or in addition, in some embodiments, the communication interface 114 includes a port for receiving a wire or cable, such as an Ethernet cable or a universal serial bus (USB) cable, to facilitate a connection to an external device or network.

The storage device 108 stores instructions executable by the processor 106 to perform the functionality described herein. The storage device 108 may also store data used with or generated by the execution of instructions by the processor 106. For example, as illustrated in FIG. 1, the storage device 108 may store a diagramming application 120. As noted above, the diagramming application 120 may be Visio® provided by Microsoft Corporation, Abode Illustrator® provided by Adobe Systems Incorporation, or a similar application that allows users to generate diagrams including visual structures. As also noted above, in addition to allowing a user to manually create diagrams (for example, by selecting or dragging and dropping visual structures, such as shapes and connectors, within a user interface), the diagramming application 120 is also be configured to automatically generate diagrams from structured data and synchronize changes between diagrams and the structured data as described in more detail below. It should be understood that the automatic generation functionality, the automatic synchronization functionality, or both described herein may be performed by the diagramming application 120 or by a separate add-in or other application that interfaces with the diagramming application 120.

The structured data used by the diagramming application 120 to generate a diagram as described below may be stored in a data source included in the user device 102, such as the storage device 108 or another storage device. Alternatively or in addition, the structured data may be stored in a data source external to the user device 102. For example, as illustrated in FIG. 1, the user device 102 may communicate with (through the communication interface 114) one or more data sources 150 over a wired or wireless connection (directly or through an intermediary device), including, for example, over a communication network to access structured data.

It should be understood that the functionality performed by the diagramming application 120 is described herein as being performed locally on the user device 102. However, this functionality (or portions thereof) may similarly be performed within a distributed environment. For example, in some embodiments, the user device 102 may communicate with a server (a cloud service) executing the diagramming application 120 or portions thereof. In particular, in one embodiment, the user device 102 may access the diagramming application 120 within a cloud service. In other embodiments, the user device 102 may execute the diagramming application 120 locally but may access a server hosting a separate application that generates and synchronizes diagrams as described herein for display and manipulation within the locally-executed diagramming application 120. Accordingly, it should be understood that the local configuration described in the present application is provided as one example and should not be considered as limiting.

Figure 2:
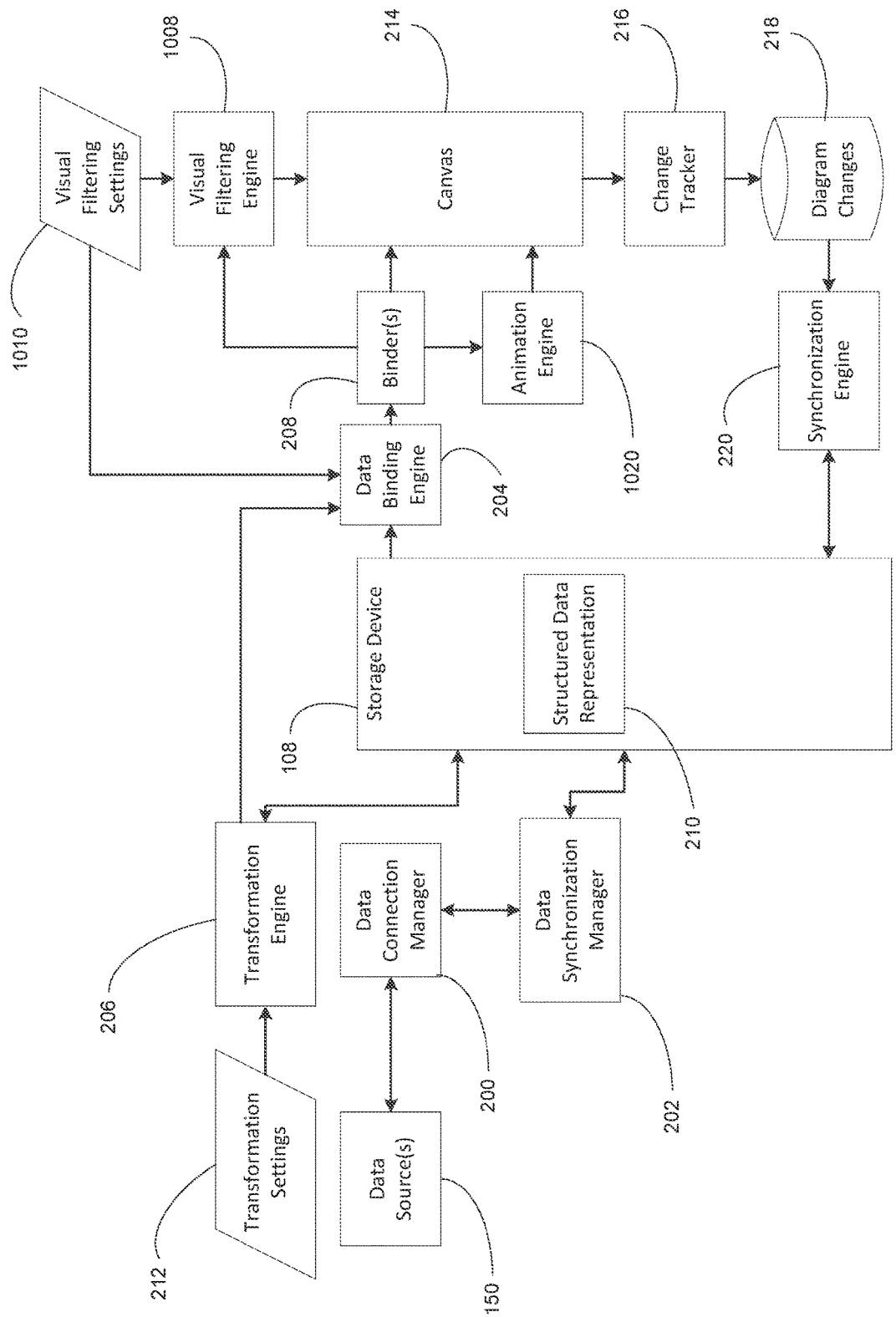
FIG. 2 schematically illustrates one architectural implementation for generating and synchronizing diagrams and structured data using the system of FIG. 1.

The diagramming application 120 may use various modules, engines, or managers (each representing a set of executable instructions) to perform the diagram generation and synchronization as described herein. It should be understood that these modules, engines, and managers may be combined and distributed in various forms to provide the functionality described herein, and FIG. 2 illustrates one example implementation. As illustrated in FIG. 2, in one embodiment, the diagramming application 120 includes a data connection manager 200, a data synchronization manager 202, a data binding engine 204, a transformation engine 206, and at least one implementation module (also referred to herein as a binder 208).

As illustrated in FIG. 2, the data connection manager 200 provides an interface to the data sources 150 to support multiple connectivity options for accessing structured data. The data sources 150 may include one or more databases, servers, cloud services, or other devices or systems including computer-readable medium storing structured data. In some embodiments, the data sources 150 also includes one or more application programming interfaces (APIs), intermediary devices, or other interfaces for accessing structured data stored in one or more additional data sources, such as custom data sources. The data connection manager 200 may communicate through these interfaces by making requests for data from the data sources 150. Also, as noted above, one or more of the data sources may be included in the user device 102 or external to the user device 102.

The structured data stored in the data sources 150 may include tabular structured data, hierarchical structured data, graph structured data, or a combination thereof. For example, the structured data may be represented within a spreadsheet file (such as a file generated with Excel® provided by Microsoft Corporation or a similar application), a database file (such as a standard query language (SQL) file), a mark-up language file (such as an extensible mark-up language (XML) file), an object notation or other data-interchange format file (such as a JavaScript object notation (JSON) file), or the like. FIG. 5 illustrates a sample spreadsheet file including a tabular structured data representation 500. Hierarchical structured data and graph structured data may represent non-tabular structured data that defines interactions between objects or nodes. For example, a graph may define a manufacturing process, wherein each node in the graph represents a manufacturing station or step. Each node may also be associated with data, including tabular data. For example, continuing with the same manufacturing process, a node may be associated with tabular data defining parts handled or completed by each node, errors logs, or the like. As compared to a tabular structured data representation that may organize data records in a two-dimensional format of rows and columns, the graph structured data representations and hierarchical structured data representations may use tags, ordered lists (arrays), name/value pairs, and the like to organize data records to define component interactions and relationships.

Structured data received by the data connection manager 200 is provided to the data synchronization manager 202, which stores a copy of the structured data to the storage device 108 (see, for example, the structured data representation 210 included in the storage device 108 illustrated in FIG. 2). As described in more detail below, when modifications are made to the structured data representation 210 included in the storage device 108, the data synchronization manager 202 updates the original version of the structured data (stored in one or more of the data sources 150) based on the modification and vice versa. The data synchronization manager 202 may also merge modifications made to either the structured data representation 210 or the original version of the structured data stored in the data sources 150 and may resolve conflicts between modifications received from multiple sources (for example, separate, uncoordinated modifications made to the structured data in the data sources 150 and the structured data representation 210). In some embodiments, the data connection manager 200, the data synchronization manager 202, or both may modify structured data received from a data source 150 to generate the structured data representation 210 stored in the storage device 108, such as by normalizing data, merging data, converting data to a common format, and the like.

The data binding engine 204 generates expressions to map data included in the structured data representations 210 to visual structures included in a diagram. For example, as described in more detail below, the data binding engine 204 may perform a binding process to define two-way mappings between data records included in the structured data representations 210 and visual structures included in a diagram. In some embodiments, the data binding engine 204 may invoke the transformation engine 206 to obtain settings for performing the binding process. For example, the transformation engine 206 may generate and output one or more user interfaces (UIs) (displayed, for example, within a user interface provided by the diagramming application 120) that prompt a user for transformation settings 212. The transformation settings 212 are used by the data binding engine 204 to transform the structured data representation 210 to visual structures. For example, the UIs generated by the transformation engine 206 may prompt a user to select a shape type for a particular data record (or category of data records) within a structured data representation 210, such as a particular column within tabular structured data. Similarly, the UIs generated by the transformation engine 206 may prompt a user to define relationships between data records (or categories of data records) included in a structured data representation 210 such that the data binding engine 204 can identify how to connect shapes or other visual structures within a diagram. In some embodiments, the transformation engine 206 accesses the structured data representation 210 stored in the storage device 108 to identify available data records or categories of data records (such as columns), which allows the transformation engine 206 to provide UIs tailored to the structured data representation 210. Further details regarding the UIs provided by the transformation engine 206 are provided below with respect to FIGS. 4 and 6-9.

The transformation engine 206 provides the transformation settings 212 to the data binding engine 204, which uses the transformation settings 212 to perform the binding process described herein. In some embodiments, the transformation engine 206 also uses the transformation settings 212 to modify a structured data representation 210 or store a new structured data representation 210 to the storage device 108. For example, the transformation engine 206 may generate an intermediate data model (stored in the storage device 108) for mapping a structured data representation 210 to visual structures. This intermediate data model may include a subset of the transformation settings 212, or data generated by the transformation engine 206, or both as well as expressions generated by the data binding engine 204.

In some embodiments, the data binding engine 204 implements or interacts with one or more implementation modules (referred herein to as binders 208) to generate and modify (edit or delete) visual structures displayed within a user interface provided within the diagramming application 120 (referred to herein as a canvas 214) based on the expressions generated by the data binding engine 204. For example, in one embodiment, the binders 208 may include a shape binder, a shape property binder, a container binder, a data graphics binder, a chart binder, and a media binder. It should be understood, however, that in some embodiments, fewer or additional binders 208 may be included in various combinations and distributions. Each binder 208 evaluates a mapping defined by the data binding engine 204 to generate or modify a visual structure displayed within the canvas 214. As one example, the shape binder may use one or more mappings defined by the data binding engine 204 to generate a particular type of shape and the shape property binder may use one or more mappings defined by the data binding engine 204 to set a property of the generated shape, such as text, connectors, size, and the like.

As visual structures are generated and displayed within the canvas 214 as a diagram, a user may modify the visual structures. These modifications may be tracked by a change tracker 216, which may communicate with an undo or reset manager associated with the diagramming application 120. The change tracker 216 may also store records representing tracked modifications to a diagram changes database 218.

As illustrated in FIG. 2, the diagramming application 120 also includes a synchronization engine 220 that maintains the structured data representation 210 synchronized with the diagram displayed in the canvas 214. For example, in some embodiments, the synchronization engine 220 accesses records stored in the diagram changes database 218 and determines (based on the expressions previously-generated by the data binding engine 204) what modifications, if any, should be made to the structured data representation 210. As noted above, when the structured data representation 210 is modified, the data synchronization manager 202 may modify the original version of the structured data stored in one or more of the data sources 150. Also, in some embodiments, the data binding engine 204 may modify or regenerate the diagram displayed within the canvas 214 (through the binders 208) based on the modified structured data representation 210 to generate mappings for any modified visual structures within the diagram, which allows a user to make further modifications to the diagram while maintaining synchronization with the underlying structured data representation 210.

It should be understood that some diagram modifications, such as changing the location of a shape within the canvas 214 does not require a corresponding change to the structured data representation 210. Also, it should be understood that rather than tracking changes to a diagram, the synchronization engine 220 may compare a version of a diagram to a previous version of the diagram to determine whether any modifications have occurred. Furthermore, the synchronization engine 220 may analyze a diagram change when the change occurs or may delay such analysis until a number of changes occur or in response to a particular trigger (such as at a predetermined frequency or in response to the saving of the diagram within the diagramming application 120).

Figure 3:
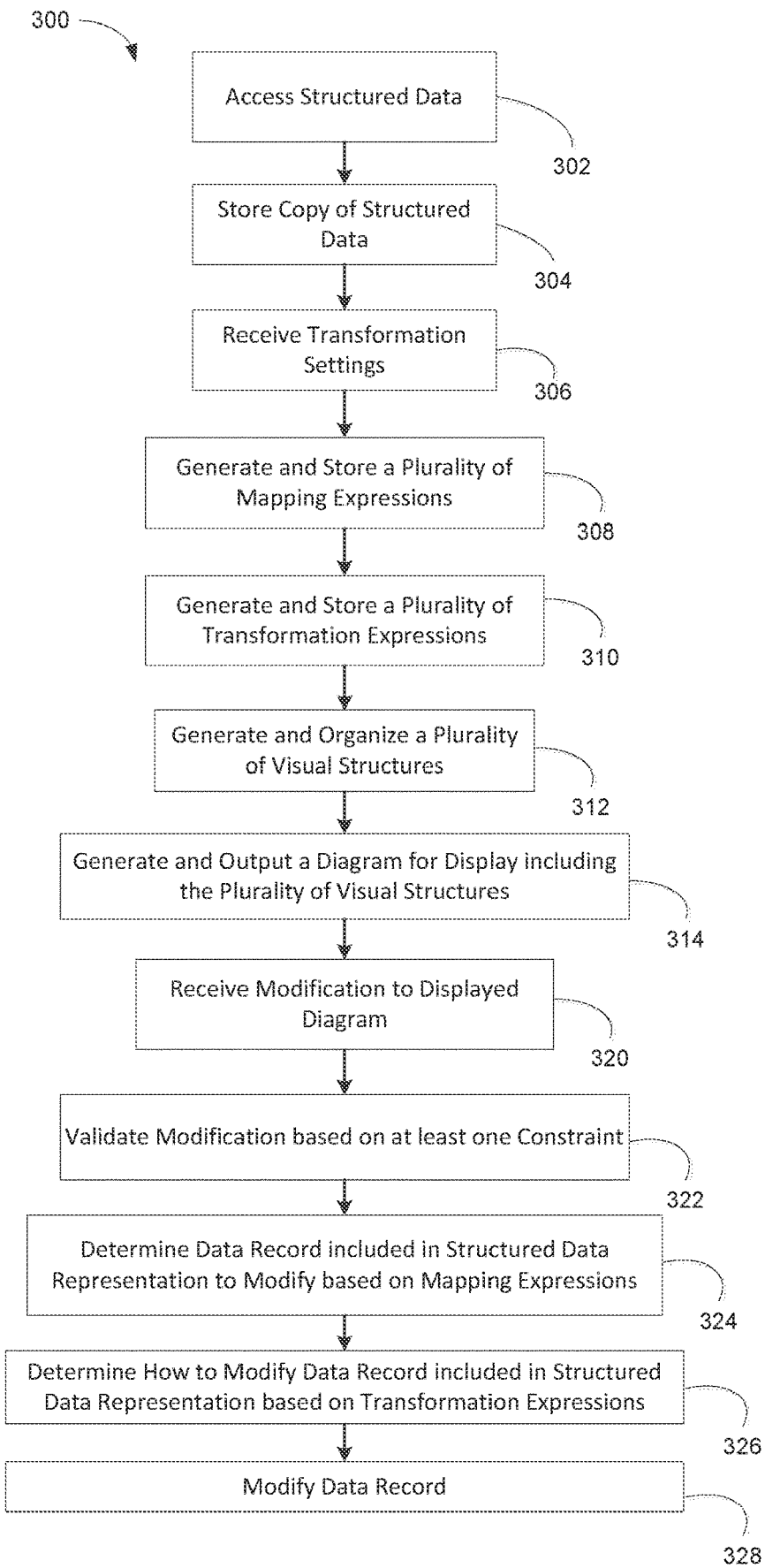
FIG. 3 is a flowchart illustrating a method of generating and synchronizing diagrams and structured data performed by the system of FIG. 1 using the implementation of FIG. 2.

FIG. 3 illustrates a method 300 performed by diagramming application 120 (as executed by the processor 106 included in the user device 102, a separate computing device such as a server, or a combination thereof) to generate a diagram from structured data and maintain synchronization between the diagram and the structured data according to one embodiment. The method 300 includes accessing structured data. The structured data may be accessed through the data connection manager 200 and the data synchronization manager 202 from one or more files stored in one or more data sources 150 (at block 302), and, in some embodiments, a copy of the accessed structured data is stored to the storage device 108 (at block 304). In some embodiments, when the structured data representation is already locally stored in the user device 102, the diagramming application 120 may not store a copy of the structured data representation in the storage device 108. However, in other embodiments, the diagramming application 120 may store the copy within the storage device 108 regardless of whether the structured data is stored locally or stored in an external data source 150 to maintain a working copy of the structured data within a data cache (see structured data representation 210 illustrated in FIG. 2) that eliminates the need to continuously access a separate file including the structured data representation.

Figure 4:
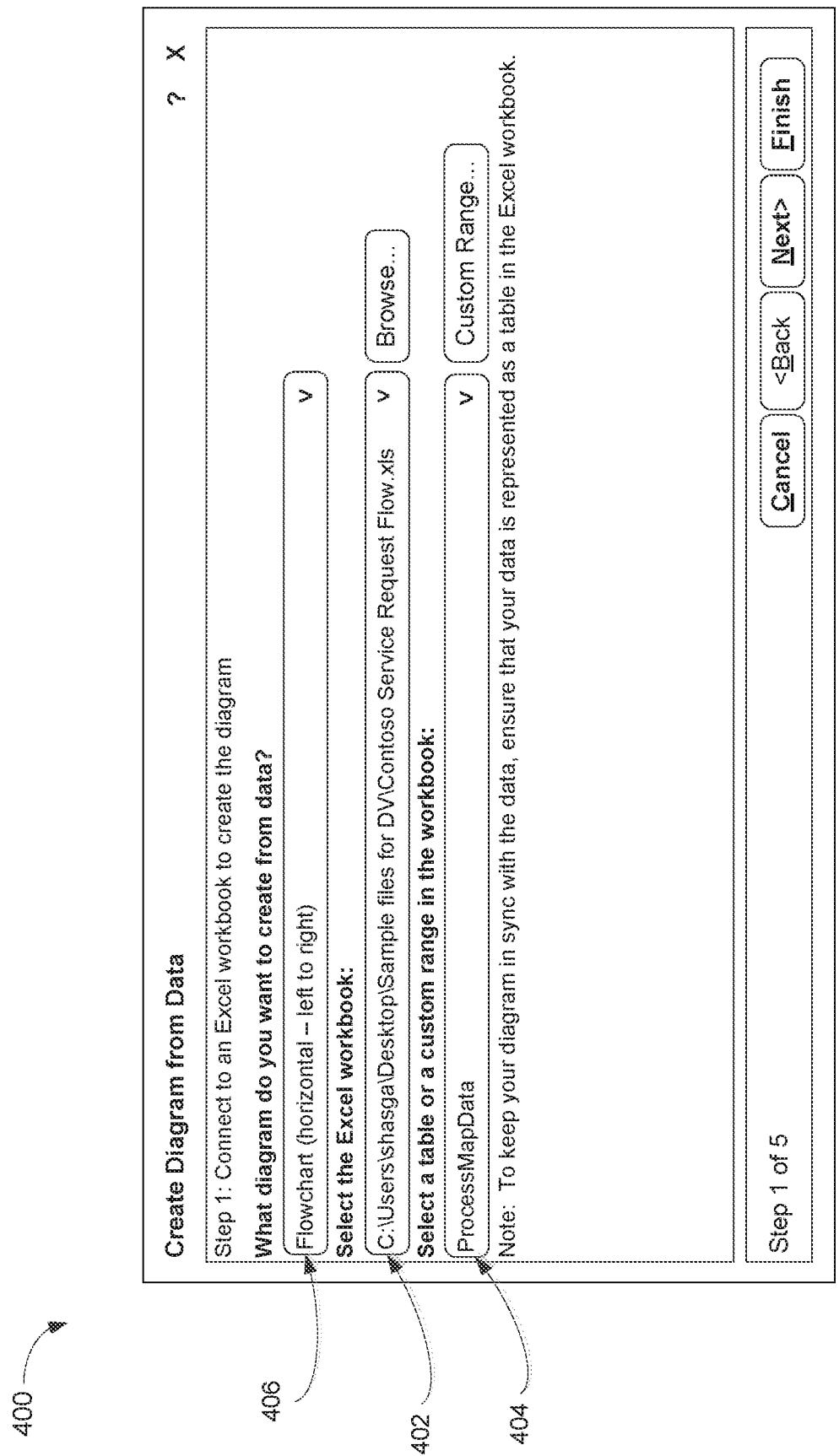
FIG. 4 illustrates a user interface prompting a user to select structured data for generating a diagram.

In some embodiments, the diagramming application 120 may display one or more user interfaces that prompt a user to select structured data. For example, FIG. 4 illustrates a user interface 400 that prompts a user to select a source of structured data. As illustrated in FIG. 4, the user interface 400 may include a filename input mechanism 402 that allows a user to input the name of a file including structured data, such as the spreadsheet file illustrated in FIG. 5. The user interface 400 may also include a browse input mechanism 403 (a button) that allows a user to locate and select a file in a local memory or an external memory. As also illustrated in FIG. 4, when a selected file includes multiple structured data representations, such as multiple tables within a single spreadsheet workbook, the user interface 400 may also include an table input mechanism 404 (a dropdown list) that prompts the user to select a particular structured data representation (a particular table) within the selected file. Similarly, when only a portion of a structured data representation included in the selected file is to be used, such as a particular range of cells included in a table within a spreadsheet file, the user may use the table input mechanism 404 to select the appropriate portion. Returning to FIG. 3, in addition to receiving a selection of the structured data representation, the diagramming application 120 also receives transformation settings 212 as described above that define how to translate data records included in the structured data representation 210 to visual structures within a diagram (at block 306). The transformation settings 212 may map data records or categories of data records (columns, tag, pairs, ordered lists) included in the structured data representation 210 to particular diagram fields or properties. As described above, in some embodiments, the transformation engine 206 generates one or more user interfaces to obtain the transformation settings 212. For example, as illustrated in FIG. 4, the user interface 400 may include a type input mechanism 406 (a dropdown menu) that prompts a user to select a diagram type, such as a basic flowchart, a cross-functional flowchart, a radial tree, a network graph, and the like. In other embodiments, the diagramming application 120 may apply a default diagram type, which may be based on the type of structured data representation selected by the user.

Figure 6:
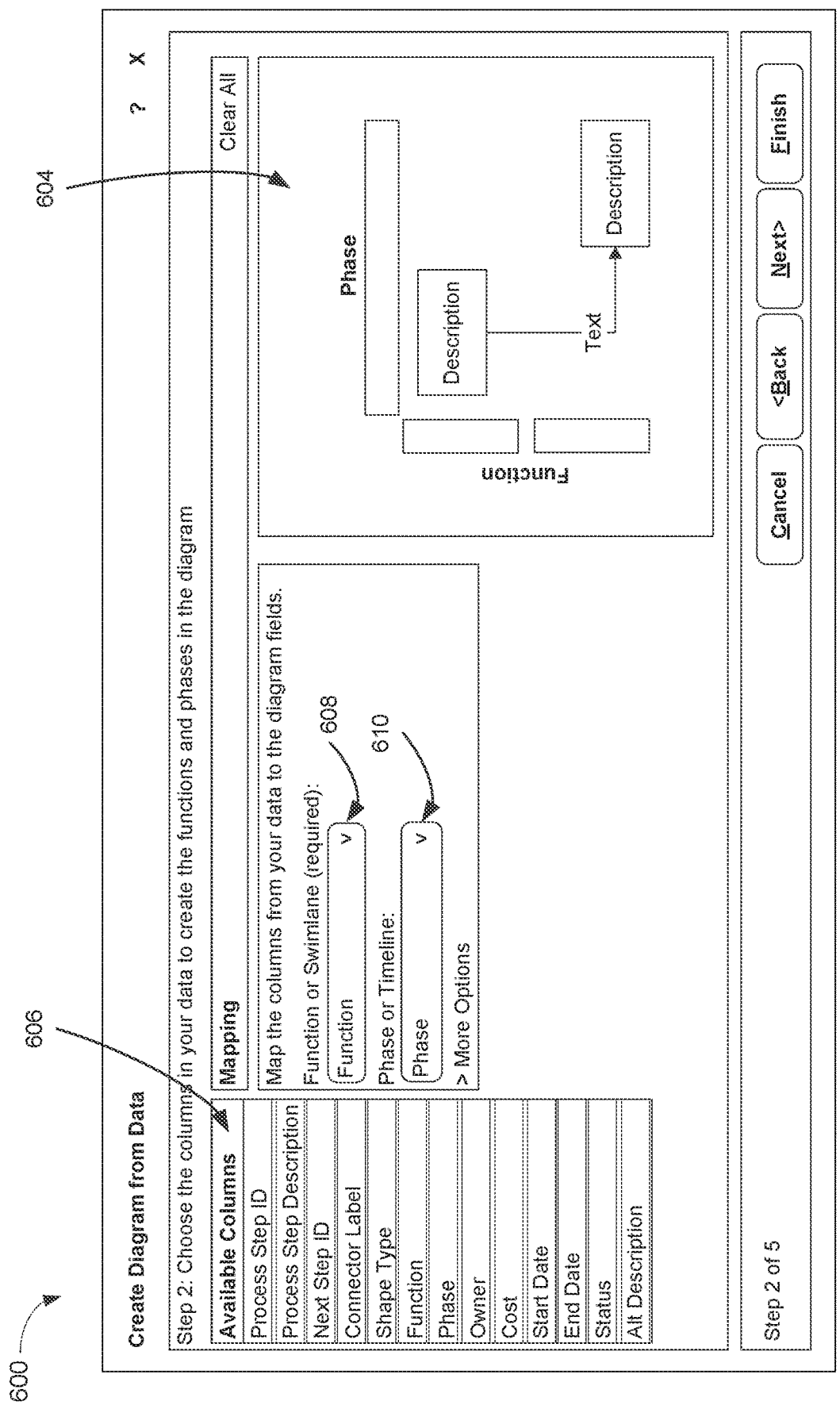
FIGS. 6-9 illustrate user interfaces prompting a user for transformation settings for selected structured data.

As illustrated in FIG. 6, the transformation engine 206 may also generate a user interface 600 that prompts the user to map data records or categories of data records (for example, available columns in a table) included in the structured data representation 210 to particular diagram fields, such as diagram axes. For example, a cross-functional flowchart includes swim lanes that represent functions including one or more phases. Thus, the user interface 600 may allow a user to specify data records (or a category of data records) included in the structured data representation 210 that define the functions of a cross-functional flowchart and data records (or a category of data records) included in the structured data representation 210 that define the phases within such functions. For example, as illustrated in FIG. 6, the user interface 600 may include a function input mechanism 608 (a dropdown list) that allows a user to indicate what column included in the structured data representation 210 defines (lists) the functions for the cross-functional flowchart and a phase input mechanism 610 (a dropdown list) that allows a user to indicate what column included in the structured data representation 210 defines (lists) the phases for each function. As illustrated in FIG. 6, in some embodiments, the user interface 600 displays a list 606 of available columns to aid the user in making these selections. Similarly, the user interface 600 may include a sample diagram 604, such as a sample cross-functional flowchart, which allows a user to understand the applicable diagram fields or layout for the selected diagram type. It should be understood that although the user interfaces illustrated herein for receiving the transformation settings 212 illustrate mapping columns within a tabular structured representation to diagram fields, similar mapping may also be performed for non-tabular structured representations, such as by mapping diagram fields to particular categories of data records, which may be represented by particular tags, names, ordered lists, and the like.

Figure 7:
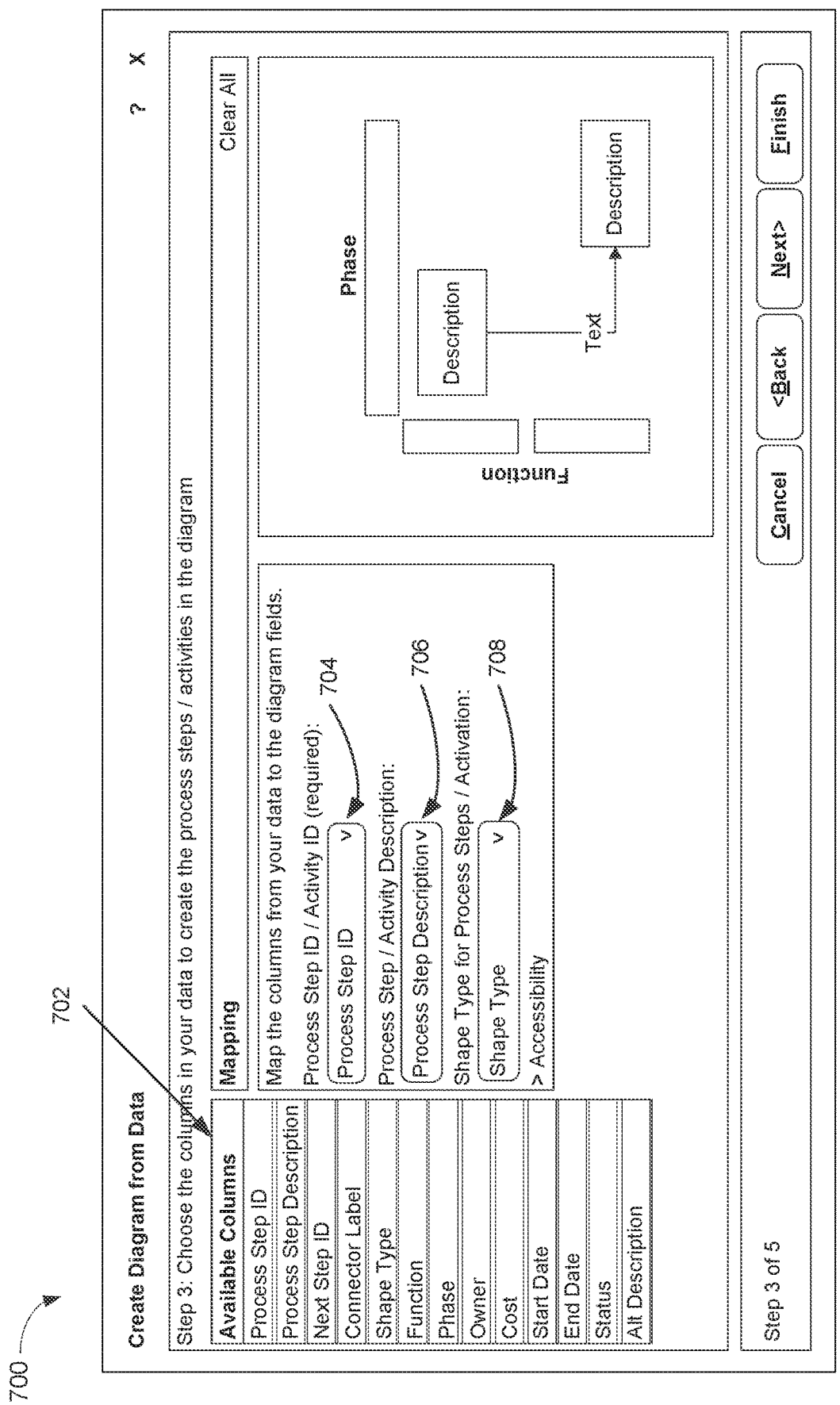

As illustrated in FIG. 7, the transformation engine 206 may also generate a user interface 700 that prompts the user to map available columns from a structured data representation 210 to particular visual structures included in a diagram. For example, as shown in FIG. 7, a cross-functional flowchart may include a set of process steps, wherein each process step is positioned within a particular function and a particular phase. Accordingly, the user interface 700 may include a step input mechanism 704 (a dropdown list) that allows a user to indicate what column included in the structured data representation 210 defines (lists) the process steps included in the flowchart (for example, by unique identifier). The user interface 700 may similarly include a step-descriptor input mechanism 706 (a dropdown list) that allows a user to specify which column included in the structured data representation 210 defines (lists) a textual descriptor for each process step. In addition, the user interface 700 may include a step-type input mechanism 708 (a dropdown list) that allows a user to indicate what column in the structured data representation 210 defines (lists) the type of each process step (for example, a "Start" step, a "Process" step, a "Data" step, a "Decision" step, and the like).

Figure 8:
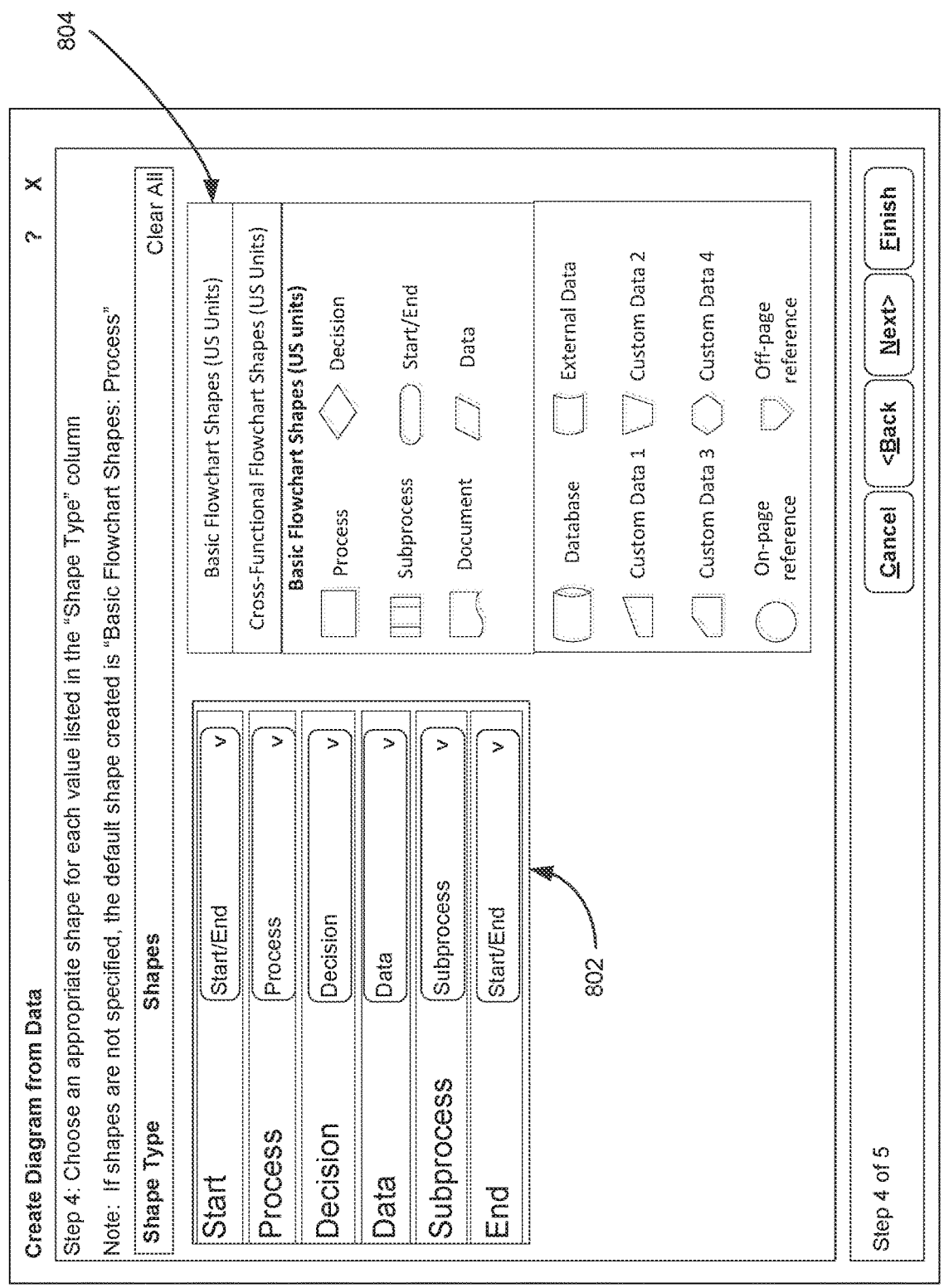
Figure 9:
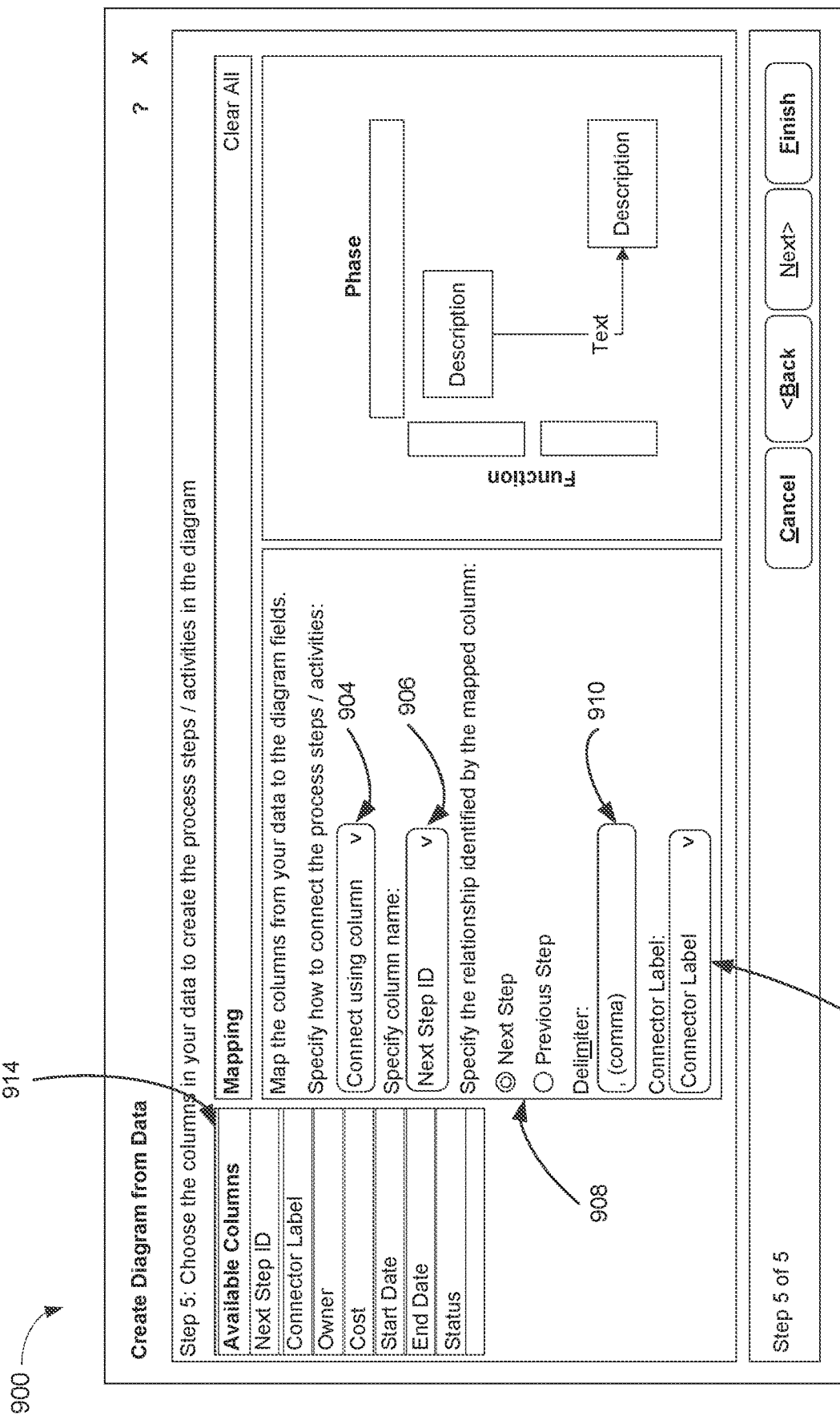

Also, as illustrated in FIG. 8, the transformation engine 206 may generate a user interface 800 that prompts the user to specify what type of shape should be assigned to each type of step (or other component represented in the diagram). For example, as illustrated in FIG. 8, the user interface 800 may include, for each step type listed in the structured data representation 210, a shape-type input mechanism 802 (a dropdown list). Each shape-type input mechanism 802 allows a user to define what type of shape should be used in the resulting diagram to represent each type of step (or other component represented within the diagram). In some embodiments, the user interface may include a list 804 of available shape types to aid a user in making these selections. As illustrated in FIG. 9, the transformation engine 206 may also generate a user interface 900 that prompts the user to specify how to connect shapes (or other visual structures) included in a diagram, such as process steps represented in a cross-functional flowchart. For example, as illustrated in FIG. 9, the user interface 900 may include connection-definition input mechanism 904 (a dropdown list) that allows a user to define how connections will be defined. For example, in some embodiments, the structured data representation may include a column that indicates a next or previous process step for a particular process step. Accordingly, in this situation, the user may be able to select a "Connect using column" option with the connection-definition input mechanism 904. The user may then use a connection-column input mechanism 906 (a dropdown list) to select the particular column within the structured data representation 210. In other embodiments, a user may use the connection-definition input mechanism 904 to designate that an order or format of data records within the structured data representation 210 represents connections (for example, indented data records may indicate the indented records contain process steps that connect to the process step in the previous, non-indented data record).

As illustrated in FIG. 9, the user interface 900 may also include a connection-type selection mechanism 908 (toggle buttons) that allows a user to specify whether the connection defined through the connection-definition input mechanism 904 and (optional) connection-column input mechanism 906 represents a next step or a previous step. Similarly, when a column defining connections indicates multiple connections, the user interface 900 may include a multiple-connection input mechanism 910 (a dropdown list) to specify how the multiple connections are designated within the column, such as whether each connection is separated by a comma, a semi-colon, or the like. In other embodiments, multiple columns may be used (for example, one column identifying a previous step and a separate column identifying a next step) rather than listing multiple connections in a single column. The user interface 900 may also include a connection-label input mechanism 912 that allows a user to specify a column included in the structured data representation 210 that defines (lists) a label for each connection. As illustrated in FIG. 9, the user interface 900 may also include a list 914 of available columns to aid the user in defining connections between shapes. As illustrated in FIGS. 6-9, the user interfaces generated by the transformation engine 206 may guide a user through the generation of a diagram from structured data without requiring programming, which makes the functionality easy to use by users with various backgrounds and skills.

The transformation settings 212 may be stored (as part of or separate from the structured data representation 210) and, in some embodiments, may be reused. For example, when the same structured data representation 210 is selected in the future for automatic diagram generation, the diagramming application 120 may load the previously-saved transformation settings 212 and may apply the settings as described herein (without or after approval or review of the transformation settings 212 by the user). Similarly, the transformation settings 212 may be stored as a template that may be applied to other structured data representations 210 that may have a similar structure or format. For example, in some embodiments, a user may share a template including transformation settings 212 with other users, which allows others users to quickly generate diagrams from structured data representations (using a consistent type, style, format, and the like) without having to manually specify all or some of the transformation settings 212. Thus, sharing transformation settings within a template may allow users associated with the same enterprise or department within an enterprise to quickly generate consistent diagrams for similarly structured data. In some embodiments, the template may also include the expressions generated by the data binding engine 204.

Returning to FIG. 2, the data binding engine 204 uses the transformation settings 212 (received from a user, from a template, or a combination thereof) to generate and store (as part of the resulting diagram as described below) a plurality of expressions that map the structured data representation 210 to a set of visual structures organized within a diagram. In some embodiments, the data binding engine 204 generates two types of expressions. A first type of expression, sometimes referred to herein as a mapping expression, links a particular data record to one or more visual structures within a diagram. A second type of expression, sometimes referred to herein as a transformation expression, transforms data included in the data record into one or more properties of a visual structure, such as shape type, size, values, descriptions, number of connections, and the like. It should be understood that the functionality provided through the first and second types of expressions may be provided through a single expression or through further types of expressions.

For example, in one embodiment, the data binding engine 204 generates a plurality of mapping expressions based on the structured data representation 210 and the transformation settings 212, wherein each of the plurality of mapping expressions links a data record included in the structured data representation 210 to a visual structure (at block 308). The data binding engine 204 also generates a plurality of transformation expressions based on the structured data representation 210 and the transformation settings 212, wherein each of the plurality of second expressions transforms data included in one of the plurality of data records into a property of a visual structure (at block 310). For example, in some embodiments, the data binding engine 204 generates a transformation expression for each type of binder 208.

Thus, to generate a diagram, the data binding engine 204 invokes one or more binders 208 to generate visual structures based on the generated expressions (at block 312). The binders 208 generate, edit, and organize the visual structures based on the applicable expressions. For example, the data binding engine 204 may invoke a shape binder to set a shape type of a visual structure, invoke a shape property binder to set a shape size, shape position, and shape description of the visual structure, and invoke a container binder to add the visual structure to a container. Similarly, if the diagram includes graphics, charts, or other media, the data binding engine 204 may call binders 208 to generate and organize these types of visual structures accordingly. In some embodiments, the expressions are stored in one or more visual object models, such as one or more ShapeSheets provided within Microsoft Visio®.

Figure 10:
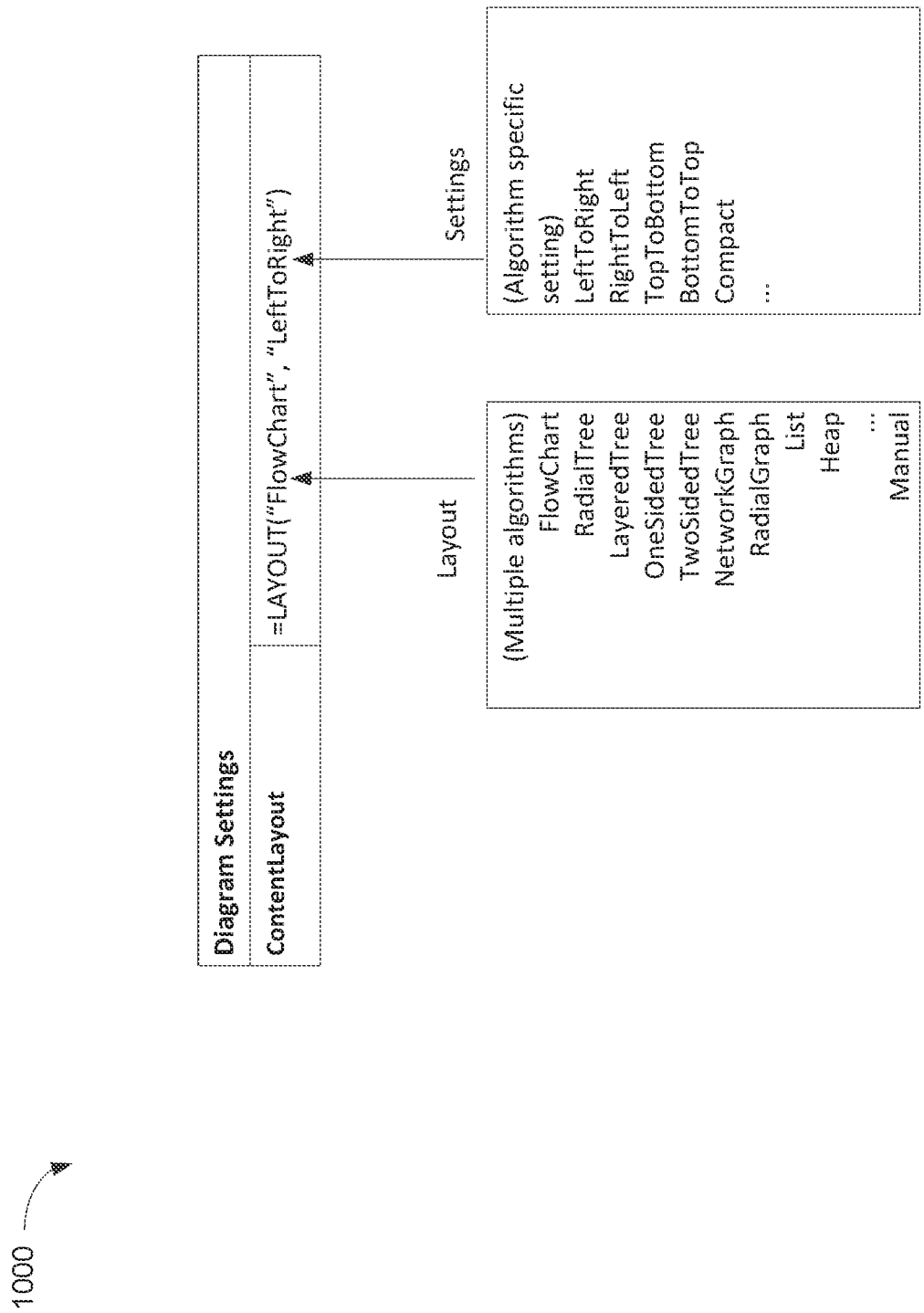

For example, the selections made using the user interface 400 may produce an expression 1000 as illustrated in FIG. 10 that may be stored in an object model for the automatically-generated diagram. The expression 1000 may set a layout of the diagram to the selected diagram type (selected through the user interface 400 as described above) and may specify one or more settings for the layout (also selected through the user interface 400). As noted above, the available diagram types or layouts may include a flow chart, a radial tree, a layered tree, a one-sided tree, a two-sided tree, a network graph, a radial graph, a list, a heap, and the like. Similarly, the settings for particular layouts may vary depending on the selected diagram type, but may include an orientation of the diagram, such as left-to-right, right-to-left, top-to-bottom, compact, and the like.

Figure 13:
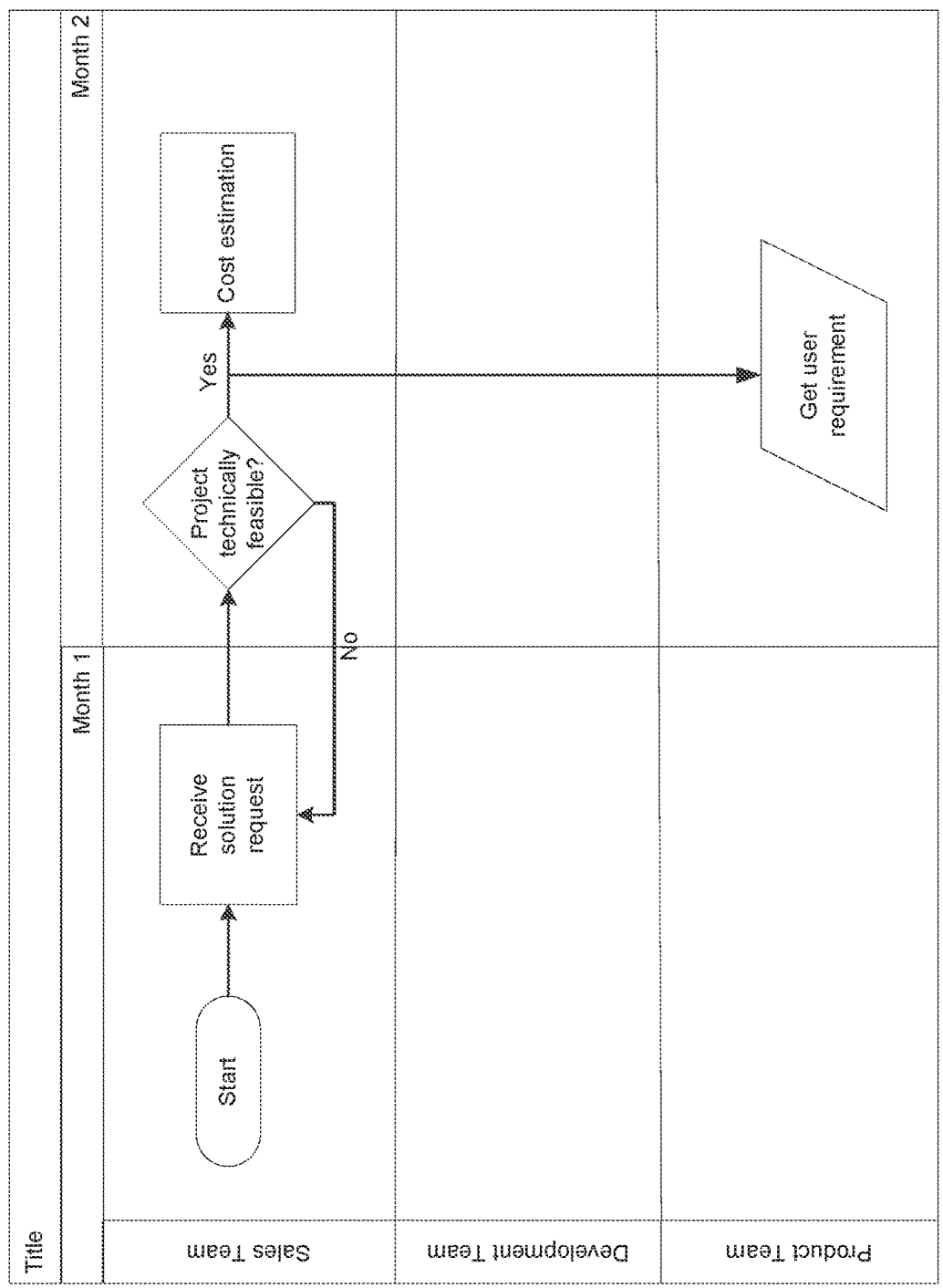
FIG. 13 is a sample diagram generated using the method of FIG. 3 for the sample tabular structured data of FIG. 5.

Similarly, the selections made using the user interfaces 600, 700, and 900 may produce the expressions 1100 illustrated in FIG. 11. The expressions 1100 may map columns in the structured data representation 210 to diagram fields or specify other diagram properties. For example, the expressions 1100 maps columns in the structured data representation 210 to functions and phases in a cross-functional flowchart and maps the names of the functions and phases to the text labels "Function" and "Phase" as selected by the user through the user interface 600. The expressions 1110 also map columns in the structured data representation 210 to process identifiers, process descriptions, and shape types as selected by the user through the user interface 700. In addition, the expressions 1100 map specific columns in the structured data representation 210 to specific connectors in the diagram as selected by the user through the user interface 900. Similarly, FIG. 12 illustrates another expression 1200 that maps specific shape types to particular visual structures based on the selections made by the user through the user interface 800. Once these expressions are generated, the binders 208 implement the expressions to generate the applicable visual structures arranged within a diagram, The resulting diagram is then output (for display through the canvas 214 within the diagramming application 120) for user review and interaction (at block 314). Outputting a generated diagram may include displaying the diagram through the canvas 214 or transmitting the diagram to user device for display when the diagram is generated in a hosted or distributed environment. FIG. 13 illustrates a portion of the cross-functional flowchart 1300 generated using the above method 300 for the sample structured data representation illustrated in FIG. 5.

As described above, in some embodiments, in addition to automatically generating a diagram from structured data, the diagramming application 120 also synchronizes modifications between the structured data and the generated diagram. For example, as illustrated in FIG. 3, the method 300 may also include receiving, through the canvas 214, a modification to a displayed diagram (at block 320). The synchronization engine 220 receives these modifications for processing. As described above, the change tracker 216 may track and store changes to the diagram changes database 218 by tracking to modifications to the diagram (for example, by interfacing with an undo or rest manager associated with the diagramming application 120). The synchronization engine 220 then uses the previously-generated expressions to determine whether a diagram modification requires a corresponding modification to the structured data and, if so, modifies the structured data representation 210 accordingly as described in further detail below. In this situation, the synchronization engine 220 may incrementally synchronize changes to the diagram with the structured data representation 210 as changes occur and details of the changes are available.

Alternatively or in addition, the change tracker 216 or the synchronization engine 220 may compare the N+1 version of a diagram with the N version to compute a delta that represents one or more modifications to the diagram. In other words, given one state of a diagram and a previous state of the diagram, a delta can be computed by comparing the two states of the same diagram. Comparing the two states may include iterating through each sub-part of a diagram to determine any deltas and then combining the deltas to define a delta of the full diagram. In this situation, incremental delta may not be tracked (through the change tracker 216), which reduces overhead and support identifying modifications when multi-users collaborate on a diagram. However, this process may be slower and more complex than tracking and processing incremental changes.

In some embodiments, as part of processing a modification to a diagram, the synchronization engine 220, the change tracker 216, or both may validate the modification based on one or more constraints (at block 322). The constraints may be associated with the diagram, the structured data representation 210, or both. For example, modifying a decision block within a diagram that compares the value of two variables (is X greater than Y) to have only one connector may be invalid because a decision block may require at least two connectors. Similarly, the structured data representation 210 may define a unique identifier for process steps. When a user attempts to add a new process step having an identifier identical to that of an existing process step, the modification may be invalid. When a modification is identified as invalid, the diagramming application 120 may generate a warning (such as a message within the canvas 214). Alternatively or in addition, the diagramming application 120 may reject the modification or may mark the modification within the diagram as a rejected modification, such as by displaying the modification in a particular color or format that distinguishes the modification from other, validated portions of the diagram. Constraints may be defined by default through the diagramming application 120 (for example, require properties for particular shape types), inferred from the structured data representation 210, defined by a user (for example, as part of the transformation settings 212), or a combination thereof.

When a modification is valid, the synchronization engine 220 uses the previously-generated expressions to determine what modification (if any) is needed for the structured data representation 210. For example, when a user changes a description of a shape within a diagram from "Convert Angle" to "Calculate Angle" and the expressions designate that this description was represented by a value within a particular column of the associated structured data representation 210, the synchronization engine 220 may need to modify the structured data representation 210 accordingly. A modification to the structured data representation 210 may include the addition, removal, or modification of a data record included in the structured data representation 210. As noted above, not all modifications to a diagram may require corresponding modifications to the structured data representation 210. For example, style or formatting modifications may not impact the data records included in the structured data representation 210.

In some embodiments, the synchronization engine 220 modifies the structured data representation 210 by determining at least one data record included in the structured data representation 210 to be modified based on the mapping expressions (at block 324). As noted above, each mapping expression links a visual structure to a particular data record. When the modification includes the addition of a new visual structure to the diagram, the mapping expressions may similarly identify that no data record is linked with the new visual structure and a new data record should be generated. After identifying the data record (or the need for a new data record), the synchronization engine 220 may use the transformation expressions to determine how to modify the identified data record (at block 326). For example, the transformation expressions may indicate whether the modified data included in the diagram (a shape property, such as a description) needs to be converted, reformatted, or otherwise processed to generated modified data for the structured data representation. The synchronization engine 220 then modifies the structured data representation 210 accordingly (at block 328).

Modifying the structured data representation 210 may cause the data binding engine 204 to modify or regenerate one or more expressions as described above and invoke the binders 208 accordingly. For example, when a new visual structure is added to a diagram that results in the addition of a new data record within the structured data representation 210, the data binding engine 204 may generate expressions for the new data record as described above. Generating these expressions allows the newly-added visual structure to be further modified within the diagram while maintaining synchronization between the diagram and the structured data representation.

In addition to modifying the structured data representation 210 locally stored in the storage device 108, the data synchronization manager 202 and the data connection manager 200 may modify the original version of the structured data in one or more data source 150. In some embodiments, this modification may not occur as frequently as modifications to the locally-stored structured data representation 210. For example, in some embodiments, modifications to data stored in the data sources 150 may be performed at a predetermined frequency or in response to a triggering event, such as saving of the generated diagram within the diagramming application 120 or detection of a change to the data source that may need to be synchronized with the diagram.

A similar synchronization process may be performed when the structured data is modified (manually or automatically). For example, when structured data stored in one or more data sources 150 is modified, the modified version of the structured data may be compared with the structured data representation 210 to compute a delta (for example, by the data synchronization manager 202). Also, in some embodiments, an original version of structured data may be locally stored (for example, in the storage device 108). In this situation, the modified version of the structured data may be compared with both the original structured data and the structured data representation 210, which may have been locally modified. Performing this three-way comparison may identify modifications represented in the structured data representation 210 that are not included in the modified version of the structured data but should not be overridden based on the modified version of the structured data. When these local modifications are not considered, modifications to the structured data may eliminate some characteristics of the original diagram (user customizations relating to visual properties) rather than merely adding, deleting, or modifying the applicable data within the structured data representation 210. The three-way comparison may also be used to merge modifications originating from the diagram and the structured data and handle conflicts with such modifications. For example, rules may be specified that govern whether modifications originating through the diagram or the structured data are given precedence when there is a conflict. Maintaining the original data structure and the locally-modified structured data representation 210 may also allow modifications needing synchronization with the data sources 150 to be quickly identified and processed. In some embodiments, modifications to structured data stored in the data sources 150 may be pushed to the diagramming application 120 (for example, the data connection manager 200). However, in other embodiments, the diagramming application 120 may pull these modifications (for example, through the data connection manager 200, the data synchronization manager 202, or both) by scanning for updates at a predetermined frequency or in response to particular triggering events.

Also, in addition to or as an alternative to performing an automatic modification of a diagram when structured data is modified, the diagramming application 120 may provide a "Refresh" selection mechanism (for example, an icon, button, menu option, or the like) that a user may select to manually initiate any modifications needed to a previously-generated diagram based on the most recent modified version of the underlying structured data.

It should be understood that the diagram generation described above may be used with or without the data synchronization as described herein. Also, in some embodiments, the diagramming application 120 may be configured to allow a user to turn off the synchronization process. For example, if a user wants to interact with a diagram in a hypothetical or draft manner, such as part of proposing a new process or making hypothetical process changes, the user may not want modifications to a diagram to be synchronized with the original underlying structured data. In some embodiments, the diagramming application 120 may also allow a user to control or configuration the synchronization, such as by setting thresholds for the types of modifications that are synchronized, setting timing constraints for performing synchronizations, working "offline" without a connection to a data source, or the like.

In some embodiments, the expressions generated as part of diagram generation may also be used to provide accessibility functionality. For example, when an audible narration is provided for a diagram displayed within the diagramming application 120, the narration may traverse the diagram in a default sequence or pattern such as in a left-to-right and top-to-bottom sequence. This sequence, however, may not necessarily follow or reflect the relationships or interactions represented within the diagram. In contrast, based on the expressions, diagram navigation may be inferred for narration and other accessibility functionality to provide the user with a richer sematic understanding of the diagram and the data behind the diagram. Similar functionality may also be used to generate a structured data representation from a manually-generated diagram.

Also, in some embodiments, a modeler may be applied between the structured data representation 210 and the diagram to apply constraints associated with particular structured data. For example, constraints for structured data or a type of structured data (for example, floor plan data, organization data, and the like) may be specified within a structured data representation, such as table. A modeler may be invoked by the diagramming application 120 to interpret the constraints and apply them to a diagram generated from a structured data representation. Thus, the constraints can be used to ensure a particular type of structured data is diagrammed accurately and consistently (conforming to a particular layout or arrangement). These constraints may also be applied by the diagramming application 120 as part of validating modifications to a diagram or structured data representation within the synchronization process described above.

As illustrated in FIG. 2, in some embodiments, the data binding engine 204 also receives visual filtering settings 1010. The visual filtering settings 1010 may be received from a user through one or more user interfaces and may be applied by the data binding engine 204 to filter visual structures included within a diagram displayed in the canvas 214. Filtering may include removing or marking particular visual structures within the diagram that satisfy the user-specified visual filtering settings 1010. For example, in some embodiments, a user may view process steps within a diagram that relate to a particular function, occur during a particular phase, have a particular value, metric, or description, have been added within the past 30 days, or the like. Accordingly, visual structures satisfying these visual filtering settings 1010 may be marked, such as be removing the structures or marking the structures in a predetermined color, format, or animation to distinguish the structures from other structures included in the diagram not satisfying the visual filtering settings 1010.

In some embodiments, the options for filtering may be defined based on the structured data representation 210. For example, the data binding engine 204 or another module included in the diagramming application 120 that generates the user interfaces prompting a user for visual filtering settings 1010 may access the structured data representation 210 to identify what filtering options are available and prompt a user to select visual filtering settings 1010 from the available options. As one example, the user interfaces may list available columns within a tabular structured data representation 210 and whether these columns can be filtering by numerical values, alphabetically, and the like. For example, FIG. 14 illustrates an example user interface 1400 that may be presented within a software application for processing structured data, such as Microsoft Excel®, and allows a data to filter the data included in the structured data representation 210. Similarly, in some embodiments, the diagramming application 120 may present a user interface for filtering the structured data representation 210 (see, for example, user interface 1500 illustrated in FIG. 15), which allows a user to apply a filter without having to use a separate software application or otherwise directly access the structured data.

Figure 16:
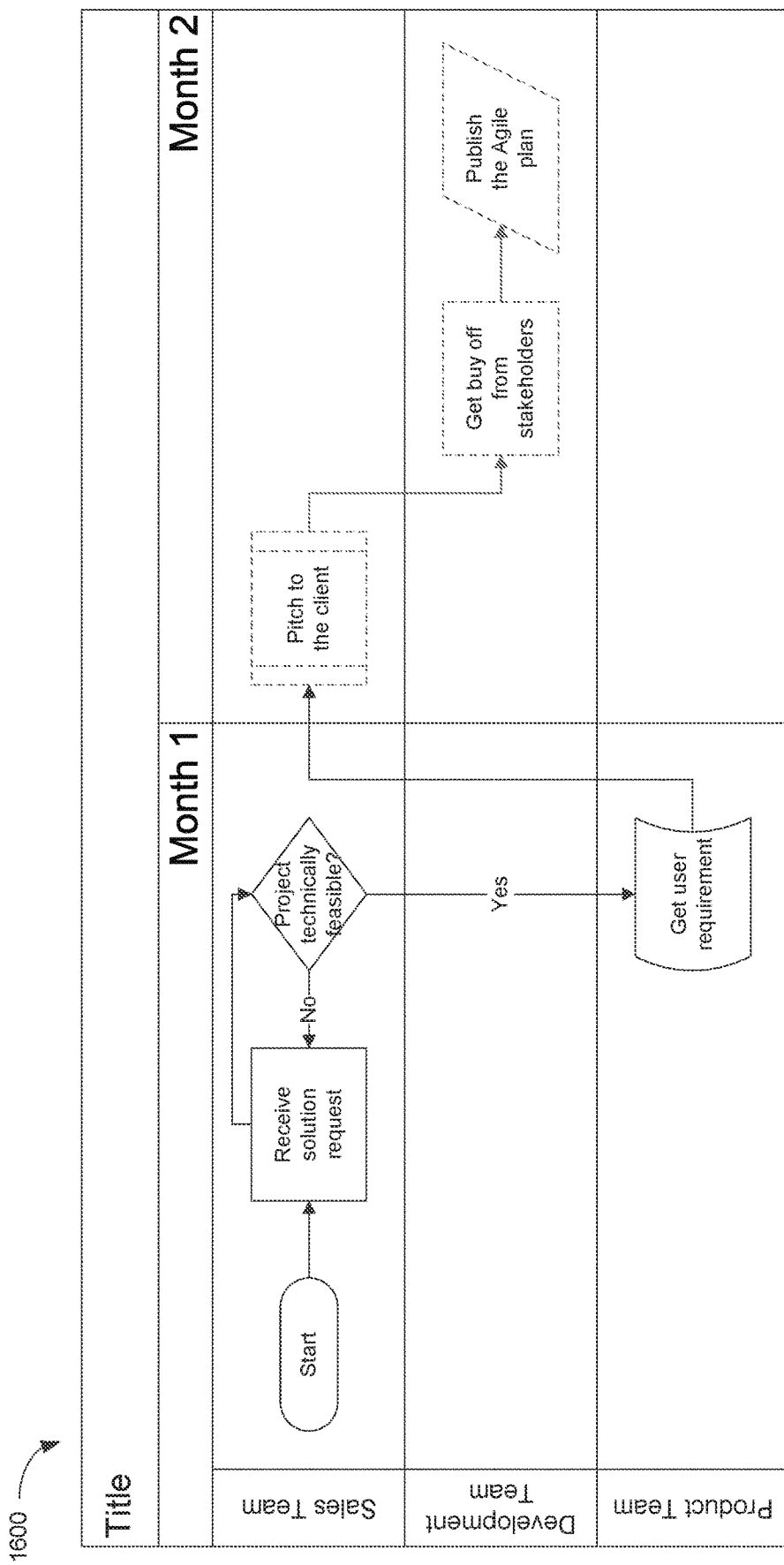
FIG. 16 illustrates a sample filtered diagram.

Based on the received visual filtering settings 1010, the data binding engine 204 may invoke a binder 208, such as a visual filtering binder, to apply the filter to a displayed diagram. In some embodiments, the visual filtering binder may use a visual filtering engine 1008 to apply and control the filter (remove a filter, re-apply a filter, mark filtered visual structures, reverse a filter, and the like). FIG. 16 illustrates an example diagram 1600 where filtered visual structures (visual structures not satisfying the filter) are illustrated in dashed lines while non-filtered visual structures are illustrated in solid lines.

Also, in some embodiments, the structured data representation 210 may include data records that correspond to data at different times, states, or phases (collected referred to herein as "state data"). In these situations, a diagram can be generated as described above to visually represent a process or system in one state, and animation may be used to visually illustrate changes represented by the state data. For example, the data binding engine 204 may be configured to invoke a binder 208 associated with animations (an animation binder). The animation binder may interface with an animation engine 1020 to apply and control animation within a diagram based on state data. For example, when a diagram visually represents a manufacturing process, animation may be used to illustrate how a component moves through the manufacturing process using the state data. The animation may illustrate the change state data through modifying data values, descriptions, shape types, shape sizes, connectors, shape layouts, and the like. Similarly, changes to the organization of an enterprise or department within an organization may be represented using animations within a diagram. Similar to the visual filtering described above, the animations may include the movement, removal, addition of visual structures, or modification of visual structures (flashing or blinking, color changes, format changes, and the like). In some embodiments, the animation engine 1020 may be configured to cycle through state data at a predetermined frequency, such as one change per second. However, in some embodiments, a user (or the structured data representation 210) may modify this default frequency. The animation engine 1020 may also allow a user to stop, pause, restart, slow down, and speed up an animation displayed within a diagram. Accordingly, both the filtering functionality and the animation functionality allow a user to interact with and analyze a generated diagram and take further advantage of the synchronization between the diagram and the underlying data.

Figure 17:
FIG. 17 illustrates sample structured data.
Figures 18A, 18B:
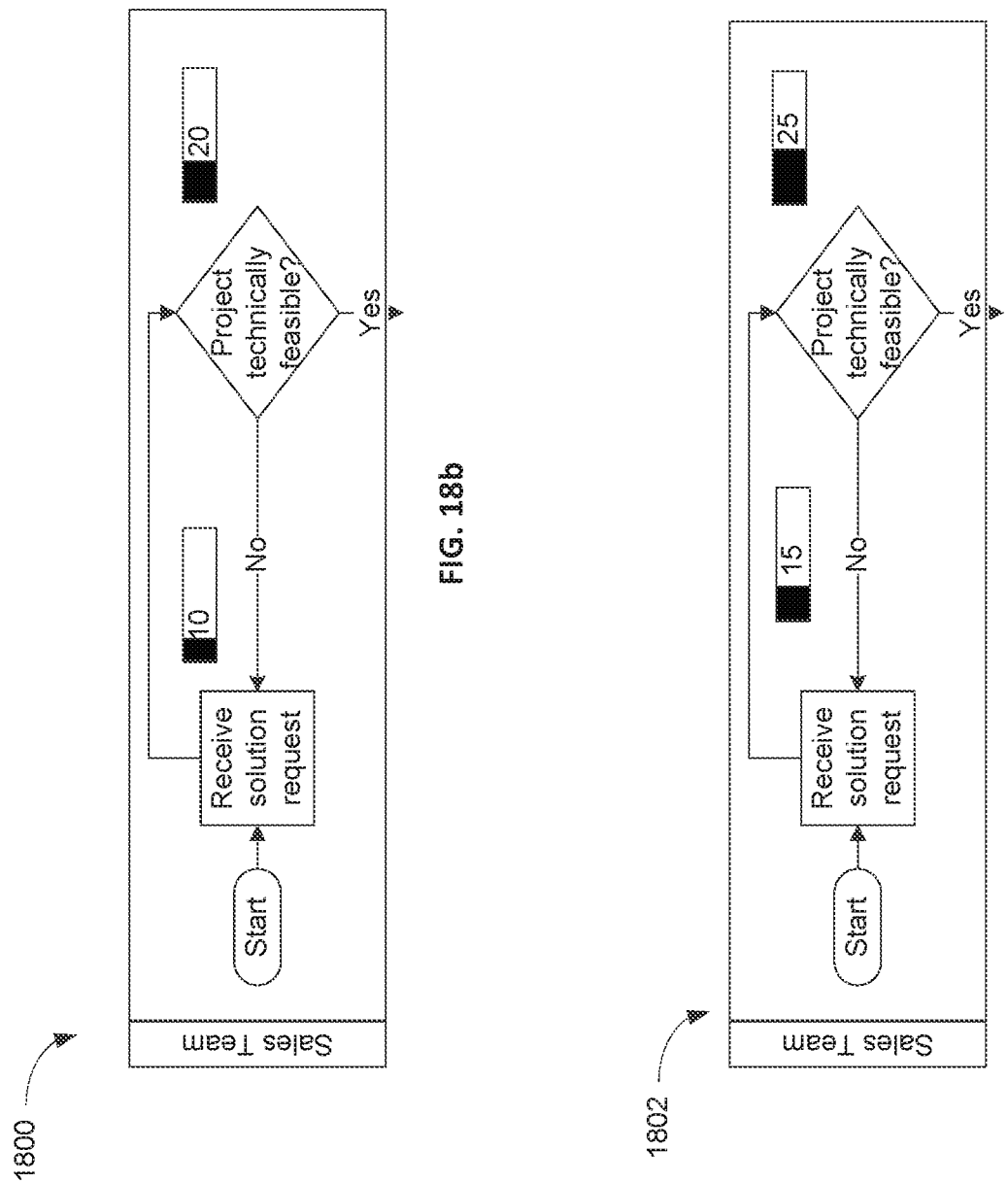

For example, FIG. 17 illustrates structured data 1700 that includes state data. In particular, the structured data 1700 includes a number of tickets associated with various processes on different days. Accordingly, the animation engine 1020 may use this data to generate and output a sequence of diagrams that illustrate the relevant data for each day represented in the structured data 1700. For example, FIGS. 18a-d illustrate a sequence of diagrams (portions thereof) illustrating the data included in the structured data 1700 for each day. In particular, FIG. 18a is a diagram 1800 based on the structured data associated with day 1, FIG. 18b is a diagram 1802 based on the structured data associated with day 2, FIG. 18c is a diagram 1804 based on the structured data associated with day 3, and FIG. 18d is a diagram 1806 based on the structured data associated with day 4. The diagramming application 120 may display the diagrams 1800, 1802, 1804, and 1806 sequentially where each diagram is displayed for a predetermined period of time. Alternatively or in addition, the diagramming application 120 may allow a user to control the time period between display of the diagrams or manually step through the sequence of diagrams (for example, by selecting a "Next" input mechanism to switch to the next diagram in the sequence).

Thus, embodiments described herein provide methods and systems for generating a diagram from structured data representations using expressions that map data records included in the structured data representations to visual structures with specific properties of such visual structures. In some embodiments, these expressions are also used to modify the structured data representation when the diagram is modified and vice versa. In some embodiments, modifications to the structured data representation, the diagram, or both may be validated to prevent modifications from violating constraints associated with the structured data representation, the diagram, or both to retain data integrity. When a modification is not verified, the modification may not be synchronized between the diagram and the structured data representation. In some embodiments, filtering and animation functionality may also be provided as analysis tools for a generated diagram. Accordingly, generating data-driven diagrams helps maintain consistency between data and associated diagrams and allows users to fully visual and analyze the data represented within such a diagram.

Various features and advantages of some embodiments are set forth in the following claims.

What is claimed is:

1. A system for generating a diagram from structured data and synchronizing modifications between the diagram and the structured data, the system comprising:
   at least one processor configured to:
      access a structured data representation, the structured data representation including a plurality of data records,
      receive a plurality of transformation settings for the structured data representation,
      generate and store a plurality of first expressions based on the structured data representation and the plurality of transformation settings, each of the plurality of first expressions mapping one of the plurality of data records to a visual structure,
      generate and store a plurality of second expressions based on the structured data representation and the plurality of transformation settings, each of the plurality of second expressions transforming data included in one of the plurality of data records into a property of a visual structure,
      generate and organize a plurality of visual structures based on the plurality of first expressions and the plurality of second expressions, the plurality of visual structures includes at least one shape and at least one connector,
      generate and output the diagram for display through a user interface, the diagram including the plurality of visual structures,
      receive a modification to the diagram through the user interface, wherein the modification is a modification to a shape of a visual structure of the plurality of visual structures, and
      modify the structured data representation based on the modification, the plurality of first expressions, and the plurality of second expressions.

2. The system of claim 1, wherein the at least one processor is further configured to validate the modification based on at least one constraint, wherein the at least one processor is configured to modify the structured data representation in response to the modification being validated, and wherein the at least one processor is further configured to reject the modification in response to the modification not being validated.

3. The system of claim 1, wherein the at least one processor is configured to modify the structured data representation by modifying at least one of a locally-stored copy of the structured data representation and an original version of the structured data representation stored in at least one data source.

4. The system of claim 1, wherein the at least one processor is further configured to receive a second modification to the structured data representation and modify the diagram based on the second modification to the structured data representation, the plurality of first expressions, and the plurality of second expressions.

5. The system of claim 1, wherein the structured data representation includes at least one selected from a group consisting of a tabular data representation, a hierarchical data representation, and a graph data representation.

6. The system of claim 1, wherein the at least one processor is configured to access the structured data representation by accessing at least one selected from a group consisting of a mark-up language file and an object notation file.

7. The system of claim 1, wherein the at least one processor is configured to receive the plurality of transformation settings by receiving the plurality of transformation settings through at least one user interface.

8. The system of claim 1, wherein the at least one processor is further configured to generate and store a template based on the plurality of transformation settings and transmit the template for use with a second structured data representation.

9. The system of claim 1, wherein the at least one processor is configured to receive the plurality of transformation settings by accessing a template.

10. A method of generating a diagram from structured data and synchronizing modifications between the diagram and the structured data, the method comprising:
  accessing a structured data representation, the structured data representation including a plurality of data records;
  receiving a plurality of transformation settings for the structured data representation;
  generating and storing a plurality of first expressions based on the structured data representation and the plurality of transformation settings, each of the plurality of first expressions mapping one of the plurality of data records to a visual structure;
  generating and storing a plurality of second expressions based on the structured data representation and the plurality of transformation settings, each of the plurality of second expressions transforming data included in one of the plurality of data records into a property of a visual structure;
  generating and organizing, with a processor, a plurality of visual structures based on the plurality of first expressions and the plurality of second expressions, the plurality of visual structures includes at least one shape and at least one connector;
  generating and outputting, with the processor, the diagram for display through a user interface, the diagram including the plurality of visual structures;
  receiving, with the processor, a modification to the diagram through the user interface wherein the modification is a modification to a shape of a visual structure of the plurality of visual structures;
  validating, with the processor, the modification; and
  in response to validating the modification, modifying, with the processor, the structured data representation based on the modification, the plurality of first expressions, and the plurality of second expressions.

11. The method of claim 10, wherein receiving the plurality of transformation settings includes receiving at least one selected from a group consisting of a diagram type, a mapping between a category of data records within the structured data representation and a diagram field, and a mapping between a category of data records within the structured data representation and a shape type, and a mapping between a category of data records within the structured data representation and an identifier of a previous visual structure or a next visual structure.

12. The method of claim 10, wherein generating and outputting the diagram includes generating and outputting at least one selected from a group consisting of a flowchart, a cross-functionality flowchart, and an organization chart.

13. The method of claim 10, further comprising filtering the plurality of visual structures included in the diagram based on a visual filtering setting.

14. The method of claim 13, wherein filtering the plurality of visual structures includes marking at least one of the plurality of visual structures satisfying the visual filtering setting, wherein marking the at least one of the plurality of visual structures includes removing the at least one of the plurality of visual structures or modifying the at least one of the plurality of visual structures.

15. The method of claim 10, further comprising animating at least one of the plurality of visual structures to represent a change in a data record associated with the at least one of the plurality of visual structures represented within the structured data representation.

16. A non-transitory, computer-readable medium storing instructions that, when executed by a processor, perform a set of functions, the set of functions comprising:
  receiving a plurality of transformation settings for a structured data representation;
  generating and storing a plurality of expressions based on the structured data representation and the plurality of transformation settings;
  generating and organizing a plurality of visual structures based on the plurality of expressions, the plurality of visual structures includes at least one shape and at least one connector;
  generating and outputting a diagram for display through a user interface, the diagram including the plurality of visual structures;
  receiving a first modification to the diagram through the user interface wherein the first modification is a modification to a shape of a visual structure of the plurality of visual structures;
  modifying the structured data representation based on the first modification and the plurality of expressions;
  receiving a second modification to the structured data representation; and
  modifying the diagram based on the second modification and the plurality of expressions.

17. The non-transitory, computer-readable medium of claim 16, wherein receiving the plurality of transformation settings includes receiving the plurality of transformation settings from a user through at least one user interface.

18. The non-transitory, computer-readable medium of claim 16, wherein the set of functions further comprises storing a template based on the plurality of transformation settings and generating and outputting a second diagram based on a second structured data representation based on the template.

19. The non-transitory, computer-readable medium of claim 16, wherein the set of functions further comprises validating the first modification before modifying the structured data representation based on at least one constraint of the diagram or the structured data representation.

20. The non-transitory, computer-readable medium of claim 16, wherein modifying the structured data representation based on the first modification and the plurality of expressions includes modifying at least one selected from a group consisting of a locally-stored copy of the structured data representation and an original version of the structured data representation.

\* \* \* \* \*